United States Patent
Lacy et al.

(10) Patent No.: US 6,524,109 B1
(45) Date of Patent: Feb. 25, 2003

(54) SYSTEM AND METHOD FOR PERFORMING SKILL SET ASSESSMENT USING A HIERARCHICAL MINIMUM SKILL SET DEFINITION

(75) Inventors: David R. Lacy, Cottage Grove, MN (US); Ted G. Lautzenheiser, Forest Lake, MN (US); Mary A. Bucher, Corcoran, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/366,060

(22) Filed: Aug. 2, 1999

(51) Int. Cl.[7] .......................... G09B 19/00; G06F 17/60
(52) U.S. Cl. ...................... 434/219; 434/350; 434/118; 705/9; 705/11
(58) Field of Search ................................ 434/350, 322, 434/323, 219, 118, 119, 307 R, 359

(56) References Cited

U.S. PATENT DOCUMENTS 6,126,448 A * 10/2000 Ho et al. .................... 434/118
6,157,808 A * 12/2000 Hollingsworth ............. 434/219
6,275,812 B1 * 8/2001 Haq et al. .................... 705/11

* cited by examiner

Primary Examiner—John Edmund Rovnak
Assistant Examiner—John Sotomayor
(74) Attorney, Agent, or Firm—Beth L. McMahon; Charles A. Johnson; Mark T. Starr

(57) ABSTRACT

An improved skill set assessment system and method is disclosed for allowing a user to assess the user's proficiency at performing a predetermined set of skills related to the user's employment position. A user may complete the skill assessment process by reviewing only a subset of skills relevant to the user's current employment position, rather than the comprehensive list of skills provided by the assessment tool. This ability to review an abbreviated list of skills is obtained by using a minimum skill set definition. Minimum skill set definitions may be defined to reflect the hierarchical structure of the organization employing the assessment system.

25 Claims, 21 Drawing Sheets

GROUPS WITH ONE OR MORE CATEGORIES
TO BE ASSESSED

SKILL SET SELECTED: PDX MINIMUM ASSESSMENT
* = GROUPS COMPLETED

| BUSINESS SYSTEMS APPLICATIONS | GLOBAL CUSTOMER SERVICE | PRODUCTS AND SERVICES |
|---|---|---|
| COMMUNICATIONS AND NETWORKS | HARDWARE | * SOFTWARE |
| COMPETITOR PRODUCTS AND SERVICES | INFORMATION SERVICES AND INFO. TECHNOLOGY | TECHNICAL DESIGN AND DEVELOPMENT |
| DOCUMENTATION | INTERNAL SYSTEMS | TRANSFERABLE |
| GENERAL BUSINESS | ENGINEERING AND DESIGN TOOLS | |

ADDITIONAL COMPETENCY DICTIONARY GROUPS:

| COMPUTER OPERATIONS AND SUPPORT | HUMAN RESOURCES | SALES AND MARKETING |
|---|---|---|
| FINANCE | LOGISTICS | YET TO BE DETERMINED |
| GENERAL ENGINEERING | MARKET SECTORS | |

BACK

FIG. 9

CATEGORIES WITH ONE OR MORE SKILLS TO BE ASSESSED:

GROUP: BUSINESS SYSTEM APPLICATIONS

SKILL SET SELECTED: PDX MINIMUM ASSESSMENT

* = CATEGORY MARKED AS COMPLETED

| ENABLING APPLICATIONS | | |
|---|---|---|
| | | |

1000

ADDITIONAL SKILL CATEGORIES:

| CROSS INDUSTRY APPLICATION PRODUCTS | CROSS INDUSTRY APPLICATIONS (PART B) | DECISION SUPPORT SYSTEMS |
|---|---|---|
| CROSS INDUSTRY APPLICATIONS (PART A) | | |

1002

BACK — 1004

FIG. 10

SKILLS TO BE ASSESSED FOR CATEGORY: ENABLING APPLICATIONS

GROUP: BUSINESS SYSTEM APPLICATIONS
SKILL SET: PDX MINIMUM ASSESSMENT
NUMBER OF SKILLS: 1

Enter/update your Proficiency Level for the skills below, check the "MARK THIS CATEGORY AS COMPLETE" box, then click on "SAVE" to update the database.
1103 — [ CLICK HERE ]   for a detailed description of the assessment scale.

Skills listed in an unmodified font are strategic skills of your corporation. Skills listed in *italics* are the strategic skills of your corporate division. Skills listed in bold are the strategic skills of your group.

| SKILL NAME AND DESCRIPTION | PROFICIENCY |
|---|---|
| SKILL: *Internet Enabled Applications* | ○ Blank/None  ○ Basic  ● Intermediate  ○ Advanced  ○ Expert |

1100

SAVE — 1106         1102

Mark this category as Complete: ☑ — 1104

---

ADDITIONAL SKILLS FOR CATEGORY: ENABLING APPLICATIONS
1108
GROUP: BUSINESS SYSTEMS APPLICATIONS
NUMBER OF SKILLS: 3

| SKILL NAME AND DESCRIPTION | PROFICIENCY |
|---|---|
| SKILL: E-mail Enabled Applications | ● Blank/None  ○ Basic  ○ Intermediate  ○ Advanced  ○ Expert |
| SKILL: Lotus Notes Mail Enabled Applications | ● Blank/None  ○ Basic  ○ Intermediate  ○ Advanced  ○ Expert |
| SKILL: MS Exchange Enabled Applications | ● Blank/None  ○ Basic  ○ Intermediate  ○ Advanced  ○ Expert |

Add Skills to Skill Set Definition — 1114

SAVE — 1110

BACK — 1112

FIG. 11

CATEGORIES WITH ONE OR MORE SKILLS TO BE ASSESSED:

GROUP: ALL REQUIRED CATEGORIES
SKILL SET SELECTED: PDX MINIMUM ASSESSMENT
* = CATEGORY MARKED AS COMPLETED

| * 1100/2200 SERIES | ENABLING APPLICATIONS | PC (PART A) |
|---|---|---|
| * A SERIES | * ENABLING TECHNOLOGY CONCEPTS | PC (PART B) |
| * BUSINESS | * ENGINEERING AND DESIGN TOOLS | PROJECT MANAGEMENT (PART A) |
| * CLIENT BUILDER METHODS | * ENVIRONMENTAL SOFTWARE DIAGNOSTICS | PROJECT MANAGEMENT (PART B) |
| * COMMUNICATIONS AND NETWORKS (PART A) | * HARDWARE | PROJECT MANAGEMENT TOOLS |

↗ 1200

ADDITIONAL SKILL CATEGORIES:

| ACCOUNTING | FINANCIAL MARKET SECTOR (PART A) | PRINTED CIRCUIT BOARD DESIGN |
|---|---|---|
| ANALOG TECHNOLOGY PRODUCTS | FINANCIAL MARKET SECTOR (PART B) | PRINTERS AND TERMINALS (PART A) |
| APPLICATION SOFTWARE CONCEPTS | FINANCIAL MARKET SECTOR (PART C) | PRINTERS AND TERMINALS (PART B) |
| BULL PRODUCTS AND SERVICES | FINANCIAL PRODUCTS (PART A) | PROCUREMENT |

↗ 1202

[ BACK ] — 1204

FIG. 12

ASSESS REQUIRED SKILLS:

You are viewing required skills only, for Categories 1 to 2 of 66 Total Categories — 1301

SKILLS TO BE ASSESSED FOR CATEGORY:
ENGINEERING AND DESIGN TOOLS

Enter/update your Proficiency Level for the skills below, check the "MARK THIS CATEGORY AS COMPLETE" box, then click on "SAVE" to update the database. [CLICK HERE] for a detailed description of the assessment scale.

Skills listed in an unmodified font are strategic skills of your corporation. Skills listed in *italics* are the strategic skills of your corporate division. Skills listed in bold are the strategic skills of your group.

| SKILL NAME AND DESCRIPTION | PROFICIENCY |
|---|---|
| SKILL: Synthesis Tools | ○ Blank/None ● Basic ○ Intermediate ○ Advanced ○ Expert |
| SKILL: *Timing Analysis and Verification* | ○ Blank/None ○ Basic ● Intermediate ○ Advanced ○ Expert |
| SKILL: *Floor Planning Tools* | ○ Blank/None ○ Basic ● Intermediate ○ Advanced ○ Expert |
| SKILL: Place and Route | ○ Blank/None ● Basic ○ Intermediate ○ Advanced ○ Expert |

[ MARK THIS CATEGORY AS COMPLETE: ]  — 1302

SKILLS TO BE ASSESSED FOR CATEGORY: COMMUNICATIONS AND NETWORKS

| SKILL NAME AND DESCRIPTION | PROFICIENCY |
|---|---|
| SKILL: Local Area Networks (LANs) | ○ Blank/None ○ Basic ● Intermediate ○ Advanced ○ Expert |
| SKILL: *TCP/IP Concepts* | ○ Blank/None ○ Basic ● Intermediate ○ Advanced ○ Expert |

| Add Skills to Skill Set Definition | [ MARK THIS CATEGORY AS COMPLETE: ]  ─ 1306 |
|---|---|
| └─ 1306 | [ SAVE CHANGES AND GET NEXT 5 CATEGORIES ] |

FIG. 13

LICENSE AND CERTIFICATION CATEGORIES TO BE ASSESSED:

| CORPORATE REQUIRED | DIVISION REQUIRED | GROUP REQUIRED |
|---|---|---|

1400  1402  1404

ADDITIONAL LICENSE AND CERTIFICATION CATEGORIES:

| ADDITIONAL PART A | ADDITIONAL PART D | ADDITIONAL PART G |
|---|---|---|
| ADDITIONAL PART B | ADDITIONAL PART E | ADDITIONAL PART H |
| ADDITIONAL PART C | ADDITIONAL PART F | ADDITIONAL PART I |

BACK  1408

LICENSE / CERTIFICATION ENTRY FOR CATEGORY:
DIVISION 1 REQUIRED

Enter/update your Certifications / Licenses for the items below, then click on "SAVE" to update the database. The fields "DATE ISSUED", "STATE", and "COUNTRY" are REQUIRED. You can delete an entry by erasing all data and clicking on "SAVE".

| CERTIFICATION / LICENSE NAME | Certificate Number | Date Issued (mm/dd/yyyy) | Expiration Date (mm/dd/yyyy) | State Where Issued | Country Where Issued |
|---|---|---|---|---|---|
| Certified Image Architect | | | | | |
| Certified Novell Administrator | | | | | |
| Certified Novell Engineer | | | | | |

BACK  SAVE

FIG. 15  1500  1502

CURRENT STATUS INFORMATION FOR: JAMES SMITH
SKILL SET SELECTED: GROUP 1 MINIMUM ASSESSMENT

1999 Ready for Review status: No status found.

| UPDATE READY FOR REVIEW STATUS | CLEAR READY FOR REVIEW STATUS |
|---|---|
| ~1608 | ~1610 |

1999 Ready for PRO Upload status: No status found.

| UPDATE READY FOR UPLOAD STATUS | CLEAR UPDATE READY FOR UPLOAD STATUS |
|---|---|
| ~1604 | ~1606 |

Skill Category Completion Status: 35 out of 66 Complete.

License / Certification Category Completion Status: 2 out of 2 Complete.

Categories with Skills to be assessed:   ~1600

| GROUP NAME | CATEGORY NAME | DATE COMPLETED |
|---|---|---|
| Business Systems Applications | Enabling Applications | 06/03/99 1:18:55 PM |
| Communications and Networks | Communications and Networks (Part A) | 05/13/99 9:10:03 AM |
| | Communications and Networks (Part B) | 05/13/99 11:06:22 AM |
| | Media Infrastructure Components | |
| | Network Management Products | |
| | Networking Software (Part A) | |
| | Networking Software (Part B) | |

LICENSE / CERTIFICATIONS TO BE ASSESSED:

~1602

| CATEGORY NAME | DATE COMPLETED |
|---|---|
| Division / Required | 1999-05-13 09:16:11 |
| Group / Required | 1999-05-13 09:14:45 |

BACK

FIG. 16

SEARCH FOR SKILLS:

Enter a phrase and the database will be searched for any skill containing the phrase anywhere in its name.

| CAD TOOLS | | SEARCH |

SEARCH FOR LICENSES / CERTIFICATIONS:

Enter a phrase and the database will be searched for any license / certification containing the phrase anywhere in its name.

| | | SEARCH |

BACK

FIG. 17

DETAILED REPORT FOR: SMITH, JAMES

Skill Category Completion Status: 35 out of 66 Complete.

License / Certification Category Completion Status: 2 out of 2 Complete.

Part 1 of this report shows all of the Skills that are required for: PDX Minimum Assessment, and the associated value that has been entered.

Part 2 shows all additional Skills that have been entered in the database.

Part 3 of this report shows all of the Licenses / Certifications that are required for: PDX Minimum Assessment, and the associated values that have been entered.

Part 4 shows all additional Licenses / Certification that have been entered in the database.

Use your web browser PRINT function to print this page for review.

ASSESSMENT SCALE: ⟵ 1800

| SKILL LEVEL DEFINITIONS | | |
|---|---|---|
| Blank | None / Not Observed | No experience in applying the skill. |
| 1 | Basic | Applies the skill, but requires additional training, experience and/or coaching. |
| 2 | Intermediate | Applies the skill without assistance, guidance, or coaching. |
| 3 | Advanced | Assists, consults, teaches and/or leads others in applying the skill. |
| 4 | Expert | Recognized as a world-class authority or internal subject matter expert on the skill. |

[ BACK ]

---

PART 1: SKILLS (ASSESSMENT REQUIRED)
GROUP: HARDWARE

| Category | Skill | Skill Rating |
|---|---|---|
| Hardware Logic | Logic Behavior Design | Intermediate |
| | Logic Behavior Simulation | Advanced |
| | Timing Analysis | Intermediate |
| | Structure Design | Basic |
| Hardware Test | Hardware Function Test | |
| | Hardware Unit Test | Basic |
| | System Integration Test | Basic |

FIG. 18

SKILL SET MANAGEMENT

Create a new Named Skill Set by supplying a Name, Author, the Skills to be included, and pressing "CREATE SKILL SET":

Note: You can select multiple skills in the skill selection box by holding down the CTRL key while you choose skills.

Skill Set Name: _____ 1900    Parent Skill Set: _____ 1909  1916
Skill Set Author: _____ 1902    MSSD ● 1905
                                  Reporting ○ 1907    1910

1906
```
1002 : Administration
1003 : Business Orientation
1004 : Business Strategy Awareness
1005 : Business / Tactical Planning
1006 : Financial / Budget Management
1007 : Program Management
1008 : Project Management
1012 : Follow-up
1014 : Organizational Awareness
1501 : Client Dedicated
```

[ Create Skill Set ]    [ Add to Skill Set ]    [ Delete from Skill Set ]
     1904                    1908                       1912

---

Delete a Named Skill set by selecting the appropriate name, and pressing "DELETE SKILL SET":

```
1100/2200 Series
A Series
Analysis
Behavior
Business
Communication and Networks
Competitors
Database Concepts
Database Management Systems
Development Languages and Tools
```

[ Delete Skill Set ]

---

Show the skills in a Named Skill Set by selecting the appropriate name, and pressing "SHOW SKILL SET":

FIG. 19

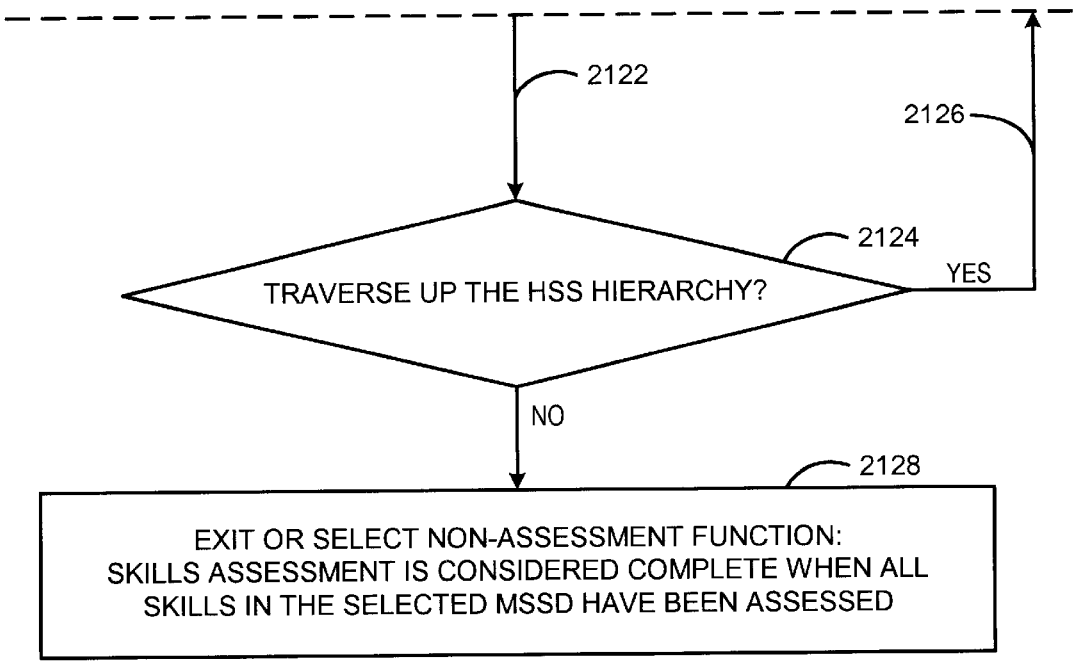
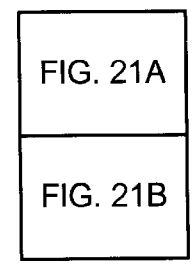
Figure 21
FIG. 21B

SYSTEM AND METHOD FOR PERFORMING SKILL SET ASSESSMENT USING A HIERARCHICAL MINIMUM SKILL SET DEFINITION

BACKGROUND OF THE INVENTION

1. Field of the Invention

This invention relates generally to an improved system and method for performing skill set analysis and assessment; and more particularly, relates to a system for allowing skill set assessment to be performed against a comprehensive set of skills using one or more minimum skill sets that may be uniquely tailored for each system user.

2. Description of the Prior Art

In today's competitive marketplace, employers are often seeking ways to evaluate and improve the effectiveness of their workforces. One way to accomplish this evaluation process is by assessing the skills possessed by their employees. This knowledge can be used to make informed employment and staffing decisions. This information may also be used to award compensation adjustments, to grant promotions, or to offer incentives that encourage employees to acquire additional skills. Training programs may be developed to compensate for deficiencies uncovered by the skill assessment process.

Skill assessment may be performed by an employee's management. More often the skill evaluation process will be completed by employees themselves. Each employee may be required to rate his proficiency at performing a set of skills considered important for adequately performing his job. Sometimes this "skill assessment" process may be performed manually. Alternatively, it may be performed with the aid of an automated skill assessment tool running on a data processing system.

Several skill assessment tools are available commercially. These tools allow a set of skills to be entered into a database for use in performing the assessment process. This skills set will generally be defined when the tool is installed for use, and can be modified during the life of the tool. The skill set will usually include all skills related to any employee located anywhere in the entity employing the skills set. For example, an automobile manufacturer employing an automated skill assessment tool may define the skills set to include all skills related to all employees, including those employees in engineering, manufacturing, marketing, managerial, and accounting positions. As a result, this comprehensive skill set may include thousands of unrelated skills ranging from those skills associated with assembly line techniques to skills relating to knowledge on acceptable accounting methods.

By defining a comprehensive skill set such as the one discussed above, any employee anywhere in the company can access the same database to gain a list of skills for which assessment is to be performed. However, the use of this comprehensive skill set may also make using the database cumbersome since only a small number of skills in the database may apply to any given employee. Returning to the previous example, an employee in the engineering development staff has no need to evaluate his proficiency at performing accounting tasks. Likewise, a marketing employee will most likely not be expected to perform skill assessment for skills related to manufacturing jobs.

Because most skills included in a comprehensive skill set definition may not be applicable to any given individual, the evaluation process may be time-consuming. This is especially true since prior art skill assessment tools do not provide a way to filter out the irrelevant skills on an employee or group basis. That is, each employee performing the analysis process must access the skills database and decide from the comprehensive skills list which skills will be evaluated and which will be ignored. Some tools provide this comprehensive skills list as an alphabetized menu of skills. This makes the evaluation process particularly difficult since the skills are not arranged in any sort of a logical manner. The user must therefore review the entire list to select applicable skills for assessment. Other tools display the comprehensive skill set using some logical groupings; for example, all skills associated with an engineering position are presented as a logical skill group. This makes the assessment process easier. However, the employee is still required to view all skill groups in the comprehensive skills set to select the groups thought to be applicable, then select the relevant skills from the selected groups so that assessment may be completed. This selection process makes skiff assessment unnecessarily burdensome and time-consuming.

The selection process associated with prior art skill assessment tools is cumbersome for other reasons. First, prior art tools do not provide a way to communicate, on an employee-by-employee basis, or on a group-by-group basis, those skills that must evaluated. As a result, an employee performing the skill assessment process may have to use an educated guess to decide which of the skills in the database are actually applicable to his job. This introduces errors into the process, since not all employees within a group may perform evaluation on the same set of skills, and the resulting evaluation data may therefore be incomplete. Alternatively, management may have to manually provide a list of skills for a given employee or employee group to use during the assessment process. This manual process is time-consuming, and introduces error into the process. Finally, several levels of management may participate in manually generating the lists of skills that are to be used by individual employees or employee groups during the evaluation process. When this list is received, there may be no indication as to which level of management selected a particular skill for addition to the list. This information may be valuable to an employee in determining the priorities to be placed on acquiring additional skills.

What is needed, therefore, is a skill assessment tool that allows a user to perform the assessment process using only that minimum set of skiffs selected from the comprehensive skiff set that is applicable to the user or to the user's group. This minimum set of skills should be communicated automatically by the tool. The tool should also communicate information related to the manner in which the selected minimum set of skills was defined. For example, the tool should communicate which level of management made the decision to add a particular skill to the minimum set of skiffs for a given employee. Finally, the tool should organize the comprehensive skill set in a manner that allows a user to easily comprehend the types of skills that must be assessed.

OBJECTS

It is a primary object of the current invention to provide an improved system and method for performing skill set assessment;

It is another object of the invention to provide a skill set analysis system that allows one or more minimum skill sets to be defined for use in more efficiently performing skill set assessment against a comprehensive set of skills;

It is still another object of the invention to provide a skill set analysis system that allows minimum skill sets to be defined that are tailored to one or more users of the system;

It is yet another object of the invention to provide a skill set analysis system wherein minimum skill sets are defined in a manner that reflects a corporate or business structure of an entity utilizing the system;

It is still another object of the invention to provide a skill set analysis system for allowing minimum skill sets to be defined in a hierarchical manner;

It is yet another object of the invention to provide a skill set analysis system that allows multiple individuals to contribute to the definition of minimum skill sets;

It is yet another object of the invention to provide a skill set analysis system that provides a comprehensive hierarchically-defined skill set;

It is a further object of the invention to provide a skill set analysis system that includes a user interface for allowing skill set assessment to be initiated at any level of hierarchy within a hierarchically-defined comprehensive skill;

It is yet another object of the invention to provide a skill set analysis system for mapping a hierarchically-defined minimum skill set against a hierarchically-defined comprehensive skill set to aid in the skill set analysis process;

It is still another object of the invention to provide a skill set analysis system capable of tracking, for any given user, those skills included in a minimum skill set for which analysis has already been completed;

It is another object of the invention to provide a skill set analysis system that includes multiple minimum skill sets, wherein a user may select one or more of the multiple minimum skill sets for use in performing skill set analysis; and It is yet another object of the invention to provide a skill set analysis system for generating reports based on minimum skill set definitions.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention.

SUMMARY OF THE INVENTION

The forgoing objects and other objects and advantages are provided in the current invention, which is an improved skill set assessment system and method for allowing a user to complete the skill set assessment process by reviewing only the subset of skills relevant to the user's employment position. According to the invention, one or more minimum skill sets may be defined for use on the skill set system. During the assessment process, the user may select one of these minimum skill sets to act as a filter, such that only those skills included in the minimum skill set need be displayed for review. This allows the skill assessment process to be tailored to an individual user. It also allows the assessment process to be completed more efficiently. The display and review of the additional skills that are not included in this minimum skill set may be optionally displayed for evaluation if desired.

According to another aspect of the invention, several levels of management may participate in the definition of one or more minimum skill sets as follows. For a designated management position, a subset of skills is selected for which assessment is required by all the employees reporting, either directly or indirectly, to that management position. The minimum skill set definition for any employee is defined by including all skills in any subset of skills associated with the management chain to which that employee reports. This is best illustrated by example. Assume a Corporation X has two divisions, A and B. The corporate management defines a subset X' of skills selected from the entire (comprehensive) skill set. These skills must be evaluated by all employees in the corporation. The management personnel of the corporate divisions also define skill subsets A' and B', which includes the skills required for analysis by those employees in divisions A and B, respectively. It may be noted that the skiffs in subset A' may be entirely different from those included in subset B'. The minimum skill set definition for the employees of division A therefore includes all skills in subsets X' and A'. These skills must be evaluated by all employees of division A. Similarly, the minimum skill set definition for the employees of division B includes those skills in subsets X and B'. Any number of levels of management hierarchy may be used to generate the minimum skill set definitions.

According to yet another aspect of the current invention, the hierarchy associated with a minimum skill set definition is displayed for a user during the skill assessment process. That is, for each of the skills included in the selected minimum skill set definition, an indication is provided to inform the user which level of management required the assessment of that skill. Returning to the previous example, assuming a minimum skill set definition for Corporation X is selected for use, those skills required at the corporate level are displayed using a first indicator, which may be, for example, a first font type. Skills required at the division level may be displayed using a second indicator, which may be a second font type. Skills required at both the corporate and division level may be displayed using either the first or second indicator, or a third indicator indicating both corporate levels required addition of the skill to the minimum skill set. This choice is dictated by user preferences. Any type of indicator may be used to perform this designation, including the color of text used to display the skill, or some other type of character symbol associated with the listed skill as displayed on a user display.

Another aspect of the invention relates to the organization of the comprehensive skill set that includes all skills in the skills database. The comprehensive skill set is organized in a hierarchical manner according to the types of skills included in the database. At the highest level of the hierarchy are broad categories of skills that are loosely related; for example, "Engineering Skills" and "Accounting Skills". At a lower level in the hierarchy are more specific skill groupings. For example, "Engineering Skills" may be divided into the skill groupings "Software Development Skills" and "Hardware Development Skills". These skill groupings may be further subdivided to include multiple subgroups, and so on. Any number of levels of hierarchy may be defined.

In the preferred embodiment, three levels of hierarchy are defined for the comprehensive skill set. When displaying the comprehensive skill set, the user may view the skill groupings at any hierarchical level. The user may further use the currently-displayed groupings to traverse the hierarchy in either an upwards or downwards direction. For example, the user may display all major skill groups. The user may then select a group for further investigation such that all skill categories included in the selected skill group and that are defined at the next lower level in the hierarchy are displayed, and so on. A listing of related skills is provided at the lowest level of the hierarchy. The capability to traverse the hierarchical skill organization allows a user to determine, "at-a-glance", which types of skills are included in the comprehensive skill set.

The hierarchical structure of the comprehensive skill set is also used when performing the skill assessment process using one of the minimum skill set definitions. After a minimum skill set definition is selected, this selected definition may be used as a filter for displaying the hierarchical groups included in the comprehensive skill set. That is, at a given hierarchical level, a particular skill grouping is displayed if at least one skill in that grouping is included in the minimum skill set definition. This feature allows the user to complete the assessment process more efficiently since all related skills may be evaluated at one time, and only those skills in the minimum skill set definition need be considered.

According to another aspect of the invention, a minimum skill set definition may be automatically selected for a user when the user invokes the assessment tool. The assignment may be based on some type of user identification, or may be automatically provided based on the location of the user input device used to invoke the tool, for example. The assigned minimum skill set is selected to reflect the user's employment position. As discussed above, this selected skill set may be defined according to the management chain to which the user reports.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIG. 9 is an illustration of a screen display provided following selection of the "Groups of Categories" function using the Minimum Skill Set Definition "PDX Minimum Assessment";

FIG. 10 is an illustration of a screen display provided following selection of the "Business Systems Applications" Group;

FIG. 11 is an illustration of a screen display provided following selection of the "Enabling Applications" Category;

FIG. 12 is an illustration of a screen display provided following selection of the "Categories of Skills" function;

FIG. 13 is an illustration of a screen display provided following selection of the "Skills list" function;

FIG. 14 is an illustration of a screen display provided following selection of the "Licensing/Certifications" function;

FIG. 15 is an illustration of a screen display provided to indicate licenses and/or certifications required by a user's corporate Division;

FIG. 16 is an illustration of a screen display provided in response to selection of the "Review/Update Status" function;

FIG. 17 is an illustration of a screen display provided in response to selection of the "Search" function;

FIG. 18 is an illustration of a screen provided after selection of the "Report" function;

FIG. 19 is an illustration of a screen provided to allow creation and deletion of Skill Sets;

FIGS. 21A and 21B, when arranged as shown in FIG. 21, is a flowchart illustrating the computer-implemented process used to perform skill set assessment with a selected Minimum Skill Set Definition and the Hierarchical Skill Structure for a given entity.

DETAILED DESCRIPTION OF THE PREFERRED EMBODIMENTS

Figure 1:
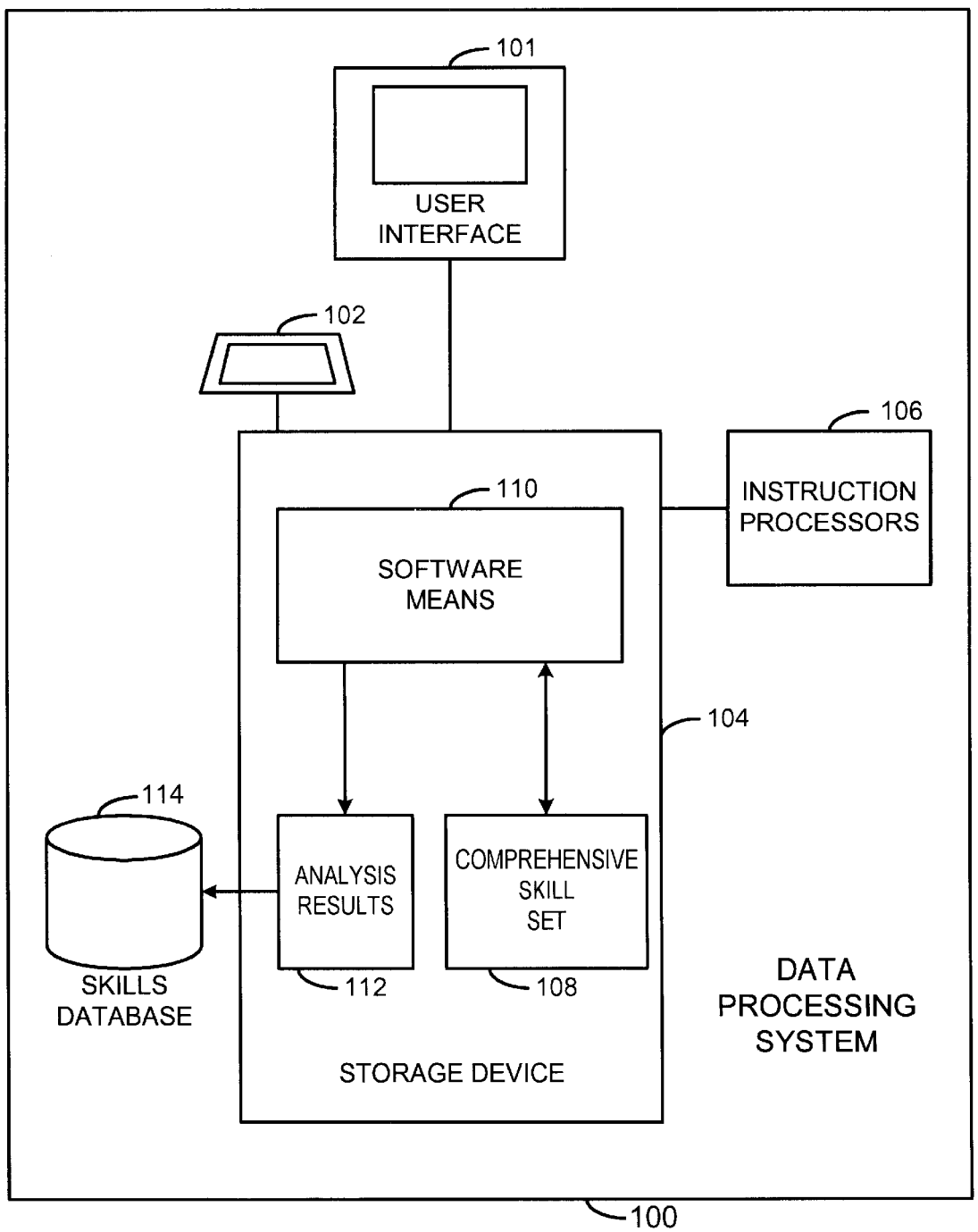
FIG. 1 is a block diagram of Data Processing System that may support a skill set analysis tool.

FIG. 1 is a block diagram of Data Processing System 100 that may support a skill set analysis tool. Data Processing System includes User Interface 101 such as a display monitor and a Data Entry Means 102 such as a keyboard and/or a point-and-click device. The User Interface and Data Entry Means are coupled to a Storage Device 104. This Storage Device is further coupled to one or more Instruction Processors 106 that provide the capability to manipulate and process data signals stored in Storage Device 104. Storage Device 104 stores a set of data signals defining a Comprehensive Skill Set (CSS) shown in Block 108. This CSS defines a comprehensive list of all skills that are to be used for analysis purposes by the users of the system. Storage Device 104 further stores Software Means shown in Block 110 that defines the process whereby users may utilize User Interface 101 and Data Entry Means 102 to display the CSS, and to further perform skill set analysis using this CSS. The results of the skill set analysis, shown as Analysis Results in Block 112, may be stored in Storage Device 104 or on some other storage means. In the preferred embodiment, the Analysis Results can be loaded into a central Skills Database 114, wherein this data is available for making hiring, training, and staffing decisions, or in awarding compensation adjustments or promotions.

As discussed above, CSS 108 includes a comprehensive list of all skills defined in the system. For a given business entity, the CSS could include skills relating to all areas of the business endeavor, including marketing, managing, manufacturing, accounting, product development, and any other task performed within that entity. As will be readily appreciated, any given user of the system will be interested in performing skill analysis using a sub-set of the entire CSS. For example, an employee in the marketing department will most likely perform skill analysis for those skills pertaining to marketing activities, and will not likely be interested in performing skill assessment using skills related to product development tasks. However, when prior art skill set evaluation systems are used, there is no way to filter out the unrelated skills for a given user.

Figure 2:
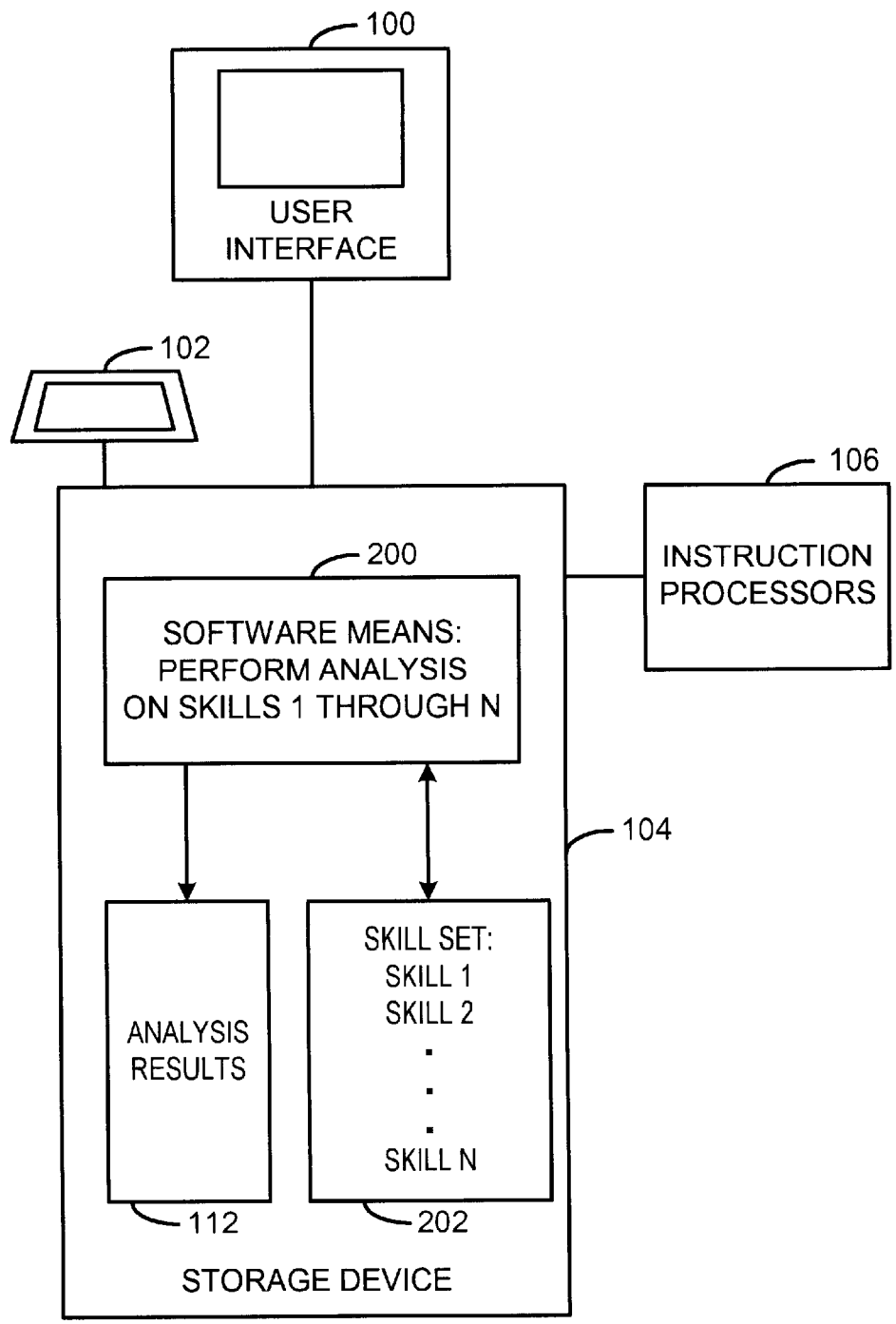
FIG. 2 is a block diagram of a prior art skill set assessment system.

FIG. 2 is a block diagram of a prior art skill set assessment system. As shown by Software Means 200, a complete skill set analysis is performed by reviewing each of the skills 1 through N in the CSS 202. That is, the user must systematically retrieve each of the skills in CSS 202 and decide whether the skill is applicable to the user's employment expectations and tasks. If the skill is relevant, an assessment is performed. Otherwise, assessment may be left uncompleted. Even though the user may choose to complete the evaluation process for the pertinent sub-set of the CSS, the process of retrieving each skill, then deciding whether assessment must be completed for the retrieved skill, may be time-consuming. This is especially true for a CSS defined to accommodate larger entities such as large corporations. Such a CSS would likely include skills associated with many diverse employment areas, as described above. Thus the time required to complete the skill assessment process becomes prohibitive, and may become a deterrent to performing this type of analysis.

Figure 3:
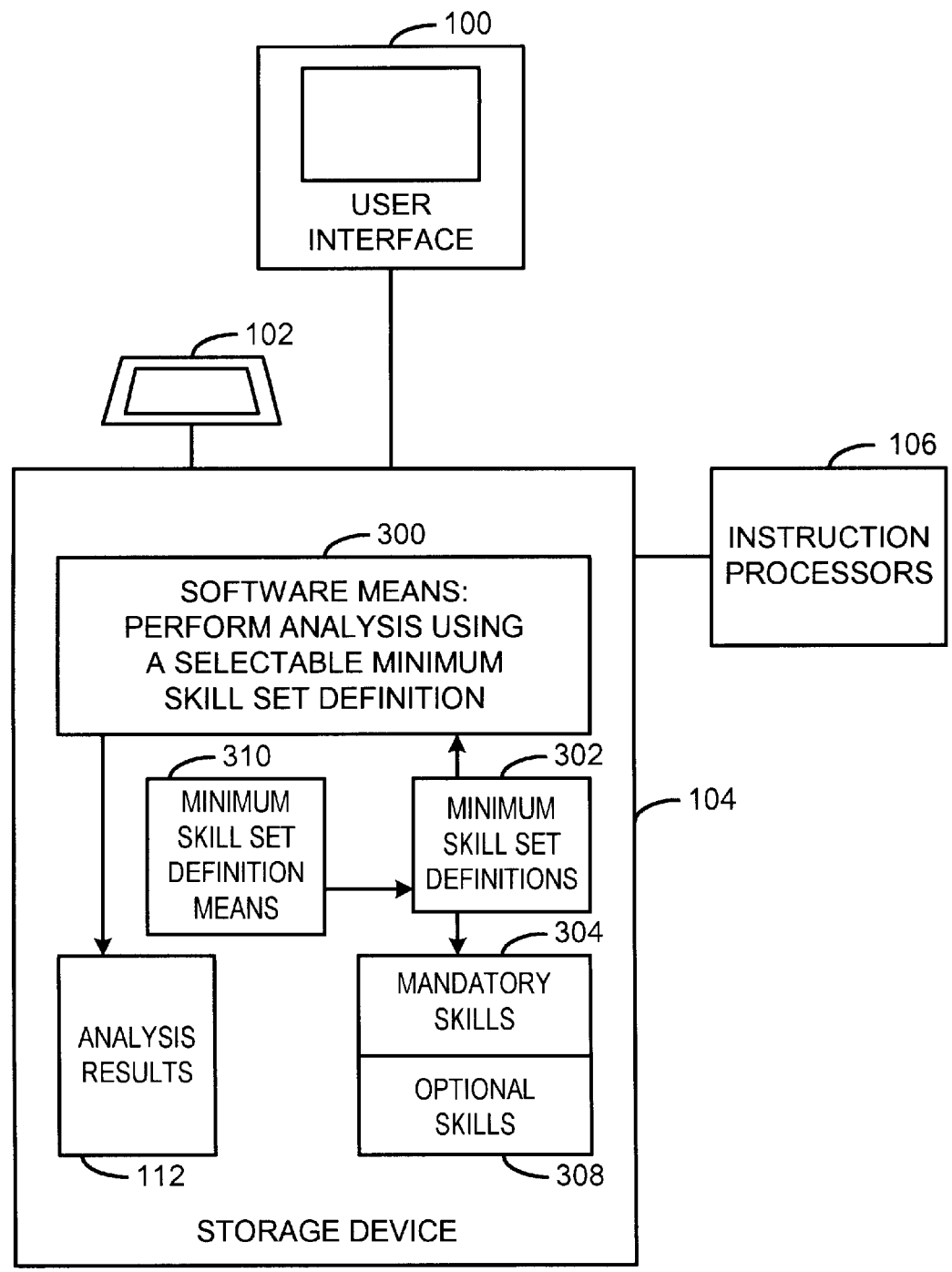
FIG. 3 is a block diagram of the current invention.

FIG. 3 is a block diagram of the current invention. Software Means 300 has access to a set of Minimum Skill Set Definitions (MSSDs) shown in Block 302. These MSSDs are selectable for any given user, and may be used as a filter such that during the evaluation process, a user need only review those skills shown as Mandatory Skills in Block 304 that are actually relevant to his employment expectations. That is, the Mandatory Skills are the skills that must be assessed for the analysis of the selected MSSD to be considered complete. All other skills in the CSS are considered Optional Skills, as shown in Block 308. The assessment process may, but need not, be completed for these Optional Skills. The MSSDs are defined using the Minimum Skill Set Definition Means 310 of Software Means 300. According to the current invention, the MSSDs are defined using the hierarchical structure of an entity employing the assessment tool. For example, an MSSD may be defined through a process that takes into account the hierarchical corporate structure of a corporation that is using the assessment tool. This will be defined in detail below.

Figure 4:
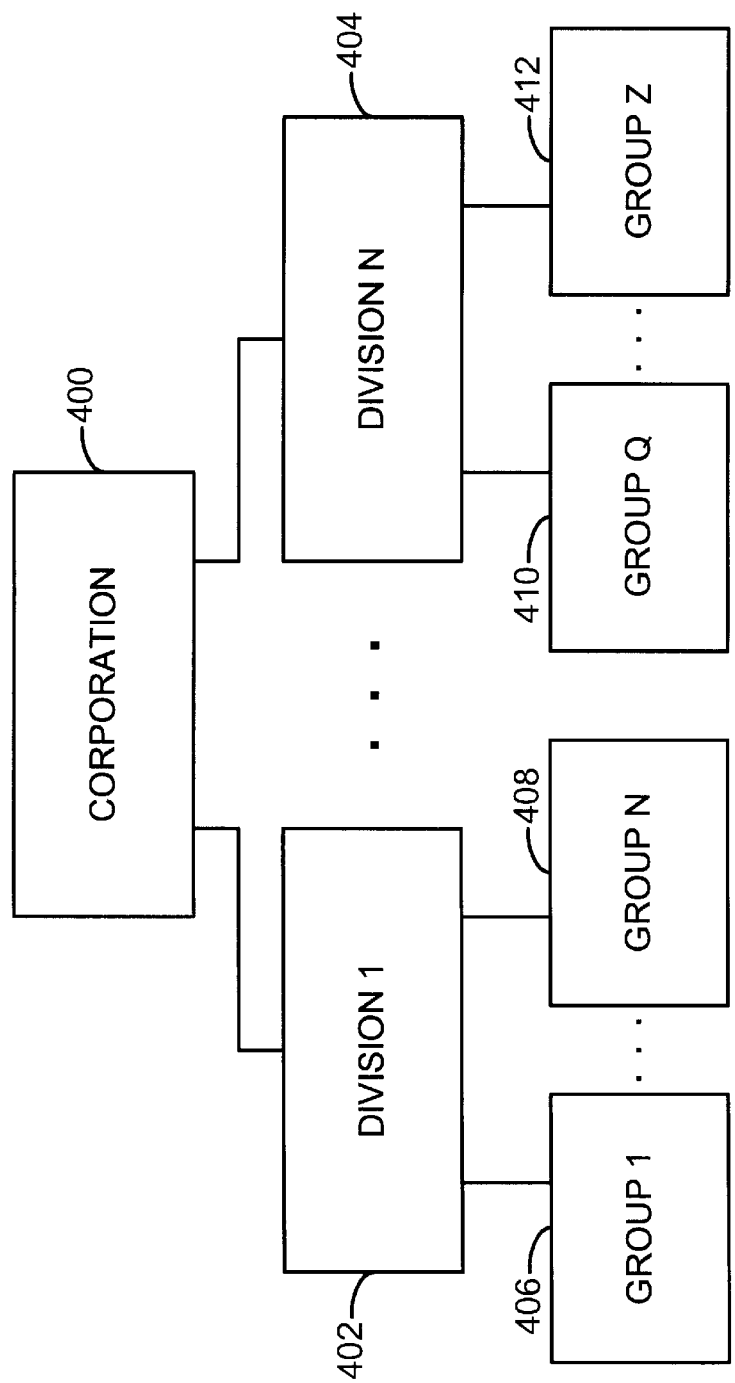
FIG. 4 is a block diagram representing the hierarchical structure of an exemplary business or other entity using the current assessment tool.

FIG. 4 is a block diagram representing the hierarchical structure of an exemplary business or other entity using the current assessment tool. This structure could be described as the Entity Hierarchical Structure (EHS). Such entities represented by this structure could include non-profit or government entities, or any other type of organizational unit. For discussion purposes, it will be assumed that the entity using the current tool is a corporation having multiple corporate Divisions and Groups. The business entity as a whole is represented by the highest level in the EHS, which is shown as Block 400. In this example, multiple corporate divisions, represented by Division 1 through Division N exist within the corporate structure, as indicated by Blocks 402 and 404 respectively. Each Division could, for example, represent that portion of the corporate entity devoted to a particular product line or lines, or located within a particular geographic region. The Divisions are further sub-divided into Groups. For example, Division 1 is shown including Groups 1 through N as represented by Blocks 406 and 408. Similarly, Division 2 is shown including Groups Q through Z, as illustrated by Blocks 410 and 412. Many more levels in the EHS may exist, and the EHS of FIG. 4 is understood to be exemplary only.

The EHS of FIG. 4 could be described as a graph having multiple nodes represented by Blocks 400 through 412. The root node, shown as Block 400, represents the overall entity. The intermediate nodes, which may be described as "child" nodes of the root node, are represented by Blocks 402 and 404. Stated otherwise, the root node is the "parent" node of the nodes shown as Blocks 402 and 404. The leaf nodes are represented by nodes 406–412. Each of the nodes (except the root node) represents a respective portion of the entity that is a sub-division of that portion of the entity represented by that node's parent node.

Figure 5:
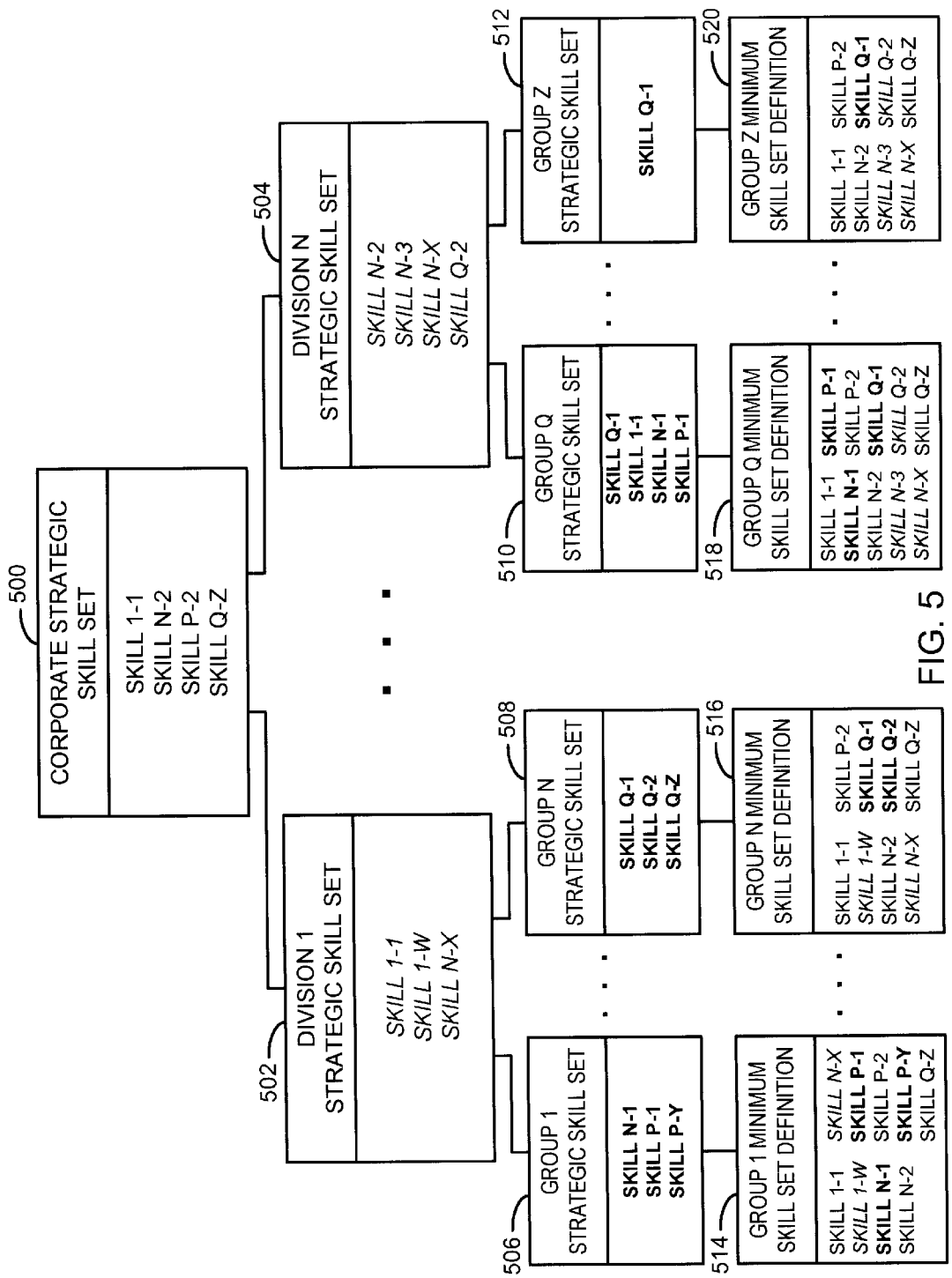
FIG. 5 is a block diagram representing the manner in which the Entity Hierarchical Structure is used to create Minimum Skill Set Definitions.

FIG. 5 is a block diagram representing the manner in which the EHS is used to define MSSDS. Each of the nodes of the EHS may be associated with a subset of the skills included in the CSS. Each of these subsets may be described generically as a "Skill Set". For example, at the top of the hierarchy is the Corporate Strategic Skill Set shown in Block 500. This Skill Set is shown including some arbitrarily designated skills such as Skill 1-1, Skill N-2, and etc. These designations will be discussed further below. This Skill Set may be defined by one or more people having the highest level of authority within the corporation. Every employee in the corporation must complete mandatory skill assessment on all skills included in the Corporate Strategic Skill Set. This Skill Set would most likely include those skills considered most important for employees to master in order to achieve corporate growth and prosperity.

Skill Sets are also associated with each of the Corporate Divisions of FIG. 4. These are shown as Division 1 Strategic Skill Set through Division N Strategic Skill Set in Blocks 502 and 504, respectively. Each of these Skill Sets includes the skills that the respective Corporate Division most wants assessed. That is, the Corporate Division has determined that each of the employees in that Corporate Division will be required to rate their proficiency at performing the skills included in the respective Skill Set. For example, all employees in Division 1 are required to evaluate themselves against Skill 1-1, Skill 1-W and Skill N-X. These skills are not necessarily the same skills required for evaluation in other Divisions, as may be seen by comparing the Division Strategic Skill Set for Division 1 to that for Division N in Block 504.

Skill Sets are further associated with each of the Corporate Groups, shown in Blocks 506–512. Each of these Skill Sets includes the skills that the respective Group most wants assessed by the employees in that Group. Therefore, all employees within the respective Group must perform an evaluation against this Skill Set. The MSSD for any employee includes all skills that must be evaluated for that employee, and therefore consists of the Corporate Strategic Skill Set, and the Skill Sets defined for that employee's Division and Group. For example, the skills to be assessed for Group 1 employees include the Corporate, Division 1, and Group 1 Strategic Skill Sets. This is shown in Block 514. The MSSDs for Groups N, Q, and Z are shown in Blocks 516, 518, and 520, respectively.

Each of the MSSDs may be described as each being mapped to a particular leaf node of the EHS. The skills included in any MSSD includes all skills included in all Skill Sets associated with the nodes in the path from the leaf node associated with the MSSD to the root node of the EHS, wherein the root node is that node associated with the entire entity. This includes the skills in the Skill Set associated leaf node and those skills in the Skill Set associated with the root node.

In the diagram of FIG. 5, the skills included in the various Skill Sets including the MSSDs are shown listed in various fonts. For example, all skills included the Corporate Strategic Skill Set are listed in an unmodified font, all skills included in each of the Division Strategic Skill Sets are listed in italicized font, and all skills included in each of the Group Strategic Skill Sets are listed in emboldened font. These font designators are used to indicate which level in the EHS required the addition of the skill to the MSSD. In the current example, the font designators indicate whether a particular skill was required at the corporate, division, or group level. For example, the Group 1 MSSD in Block 514 includes Skill N-X listed in italicized font, indicating this skill was required at the division level by Division 1 Strategic Skill Set. In the preferred embodiment, a skill that is required at multiple levels is shown using the font designator associated with the highest level in the EHS. For example, Skill 1-1 is required at both the corporate and division level for Division 1 Strategic Skill Set, and is therefore indicated as being required at the corporate level within the Group 1 MSSD. This is an arbitrary choice, and some other method could be used to resolve this type of conflict. For example, skills required at multiple levels could be displayed in an entirely different font to indicate this overlap. Furthermore, other types of designators could be used to distinguish between the various hierarchical levels. For example, colored fonts or character string designators could be used instead of font types to indicate which level in the EHS made the requirement for this skill. The use of the MSSDs and the font designators will be discussed below.

Before discussing the use of MSSDs in more detail, a discussion of the CSS of the preferred embodiment is provided. The CSS includes all skills defined for use by all users in performing all skill set evaluations. Thus, for a medium or large-size entity such as a large corporation, the CSS includes skills associated with a wide array of activities that cover everything from marketing, business planning initiatives, product development, manufacturing and support, and the like. In the preferred embodiment, the CSS is organized into a Hierarchical Skill Structure (HSS) that makes a disparate set of skills easier to understand and use. Within the HSS, skills are grouped such that skills related to each other and to a particular area of knowledge or expertise are included in the same skill grouping.

Figure 6:
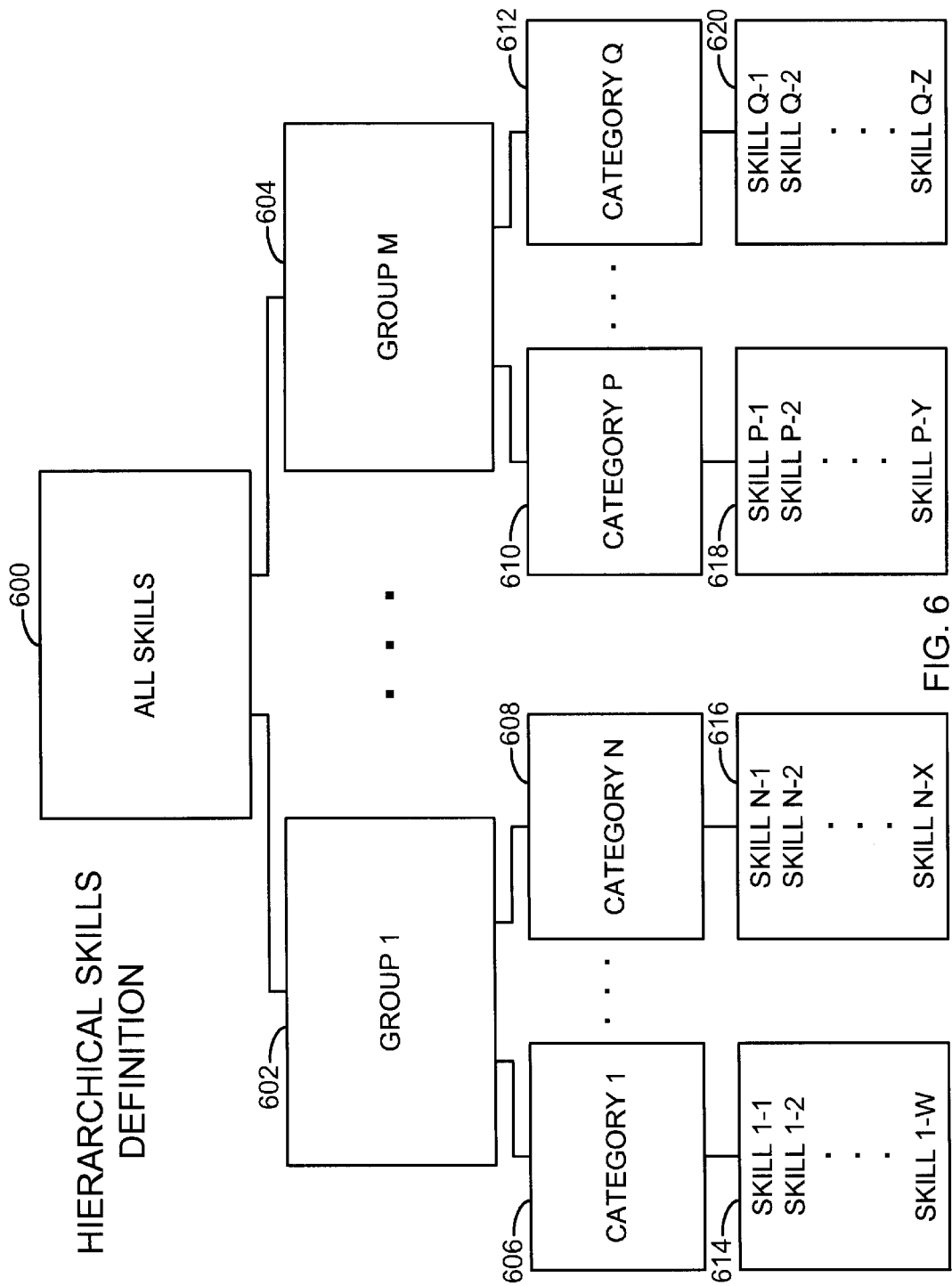
FIG. 6 is a diagram showing the Hierarchical Skill Structure of an exemplary embodiment.

FIG. 6 is a diagram showing the Hierarchical Skill Structure of an exemplary embodiment. At the top, or root node, of the hierarchy is the list of all skills, as shown in Block 600. At the next level in the hierarchy, the intermediate nodes are shown as Groups 1 through M in Blocks 602 and 604, respectively, wherein each of these nodes is associated with a respective subset of the skills represented by the parent node in Block 600. Each Group is further subdivided into groupings shown as Category 1 through Category N for Group 1, and Category P through Category Q for Group M. Each of these additional Categories is associated with a subset of the skills represented by a respective parent node in either Block 602 or Block 604. These Categories are represented by Blocks 606–612. The exemplary lists of skills for each of the Categories are shown in Blocks 614–620, respectively. It will be appreciated that Group 1 includes all skills included in Categories 1 through N, and Group M includes all skills included in Categories P through Q. In the current example, the Categories are at the lowest level of hierarchy in the HSS and are therefore said to be leaf nodes, although many additional levels of hierarchy within the HSS could be defined, with many more groupings existing at each level in the hierarchy.

The HSS is stored in Storage Device 104. The hierarchical nature this structure may be implemented by storing pointers or other indicators as is known in the art to indicate the relationships between parent and child nodes.

As exemplary use of the above-described HSS is provided for a Comprehensive Skill Set utilized by a corporation that manufactures and supplies electronics equipment and associated software products. According to this example, one Group may be defined as "Hardware" and include as Categories the various hardware products designed and manufactured by the corporation. The skills included in each of the Categories could be those skills required for proficiency in the design, test, and support of the respective product. Another group may be defined as "Software", and may include as Categories the various software products developed by the corporation. The skills included in each of the Categories would therefore include those skill required for the development of the respective software product.

As is evident from the above discussion, the system of the preferred embodiment includes two hierarchical definitions, the Entity Hierarchical Structure and the Hierarchical Skill Structure. The Entity Hierarchical Structure defines the structure of an entity, and is used to define the Minimum Skill Set Definitions. The Hierarchical Skill Structure is used to organize the Comprehensive Skill Set so that it is easier to understand and use. These two hierarchical structures are superimposed in the current system to provide a skill set analysis tool that is easier to use than prior art systems.

Figure 7:
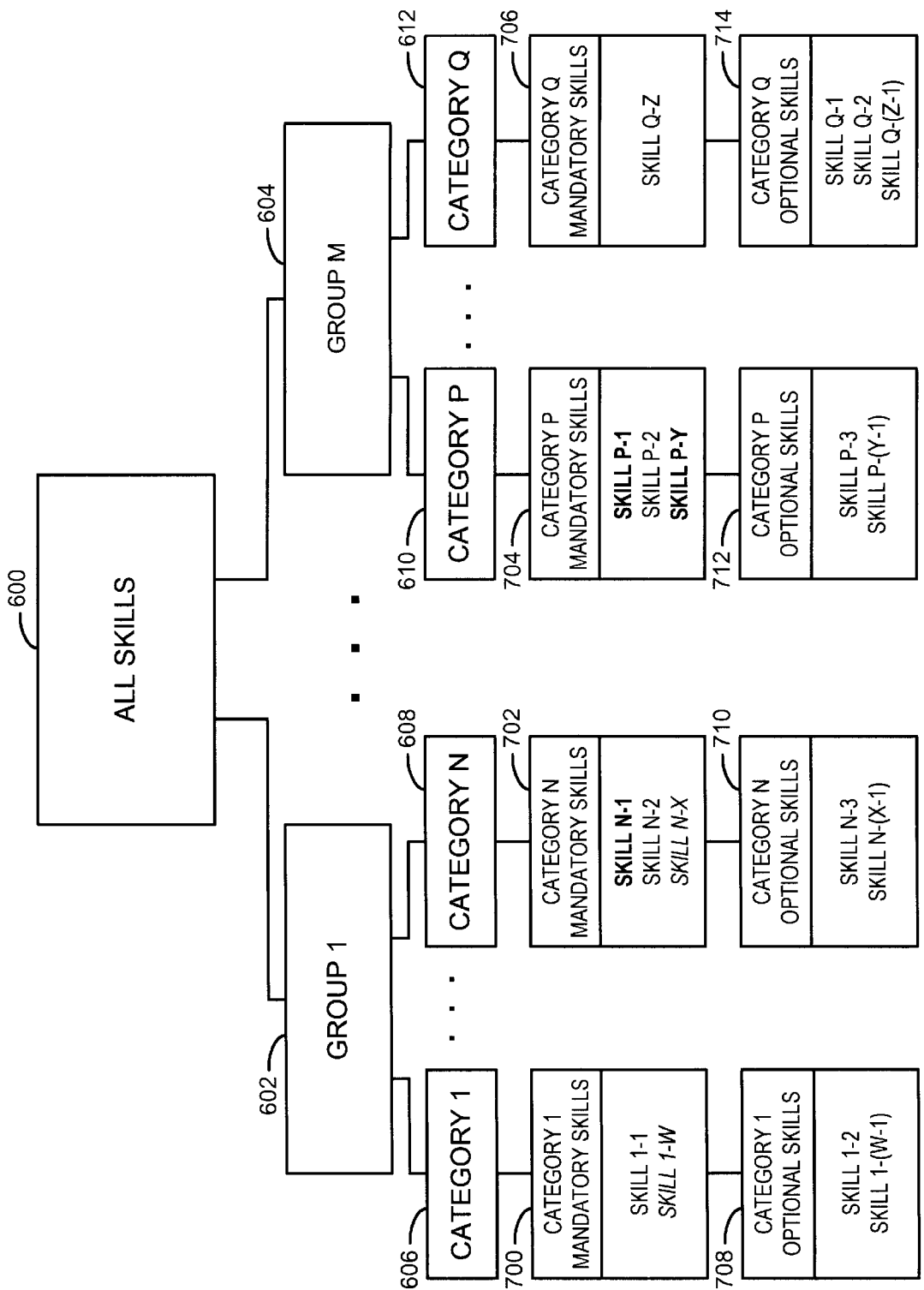
FIG. 7 is a block diagram showing the Hierarchical Skill Structure of the current example being displayed using the Group 1 Minimum Skill Set Definition.

FIG. 7 is a block diagram showing the HSS of the current example being displayed using the Group 1 MSSD as shown in Block 514 of FIG. 5. As is readily apparent, the HSS of FIG. 7 is the same as that shown in FIG. 6, with Block 600 representing all skills in the CSS defined for the system. At the next level in the hierarchy are the skill groupings shown as Group 1 through Group M in Blocks 602 and 604, and Categories 1 through N and P through Q in Blocks 606, 608, 610, and 612.

FIG. 7 further shows the skills included in each of the Categories divided into two groups, with the first group including mandatory skills, and the second group including optional skills. The mandatory skills are those skills included in a selected MSSD, whereas the optional skills include all skills not listed in the selected MSSD. As mentioned above, in the current example, the mandatory skills are those skills included in the MSSD for Group 1 of FIG. 5. More specifically, the MSSD for Group 1 includes nine skills selected from the Comprehensive Skill Set represented by those skills in Blocks 614–620 of FIG. 6. The skills are shown arranged according to the groupings of the HSS in Blocks 700, 702, 704, and 706. Namely, the skills from the MSSD for Group 1 that are included in Category 1 are shown listed as Category 1 Mandatory Skills in Block 700, and so on. All skills not included in the selected MSSD are shown arranged according to skill category, and listed in Blocks 708, 710, 712, and 714. For example, all skills from Category 1 that are not included in the MSSD are shown in Block 708.

In the current invention, a user of the skill set analysis tool is allowed to view the hierarchy of skills using a selected MSSD as a filter. The user is only required to perform analysis on those skills included the selected MSSD, and may optionally perform analysis on any other skills not included in the selected MSSD. This greatly reduces the amount of time required to perform analysis. The method for performing skill set analysis using the preferred embodiment of the current invention is described in more detail in reference to FIGS. 8 through 21.

Figure 8:
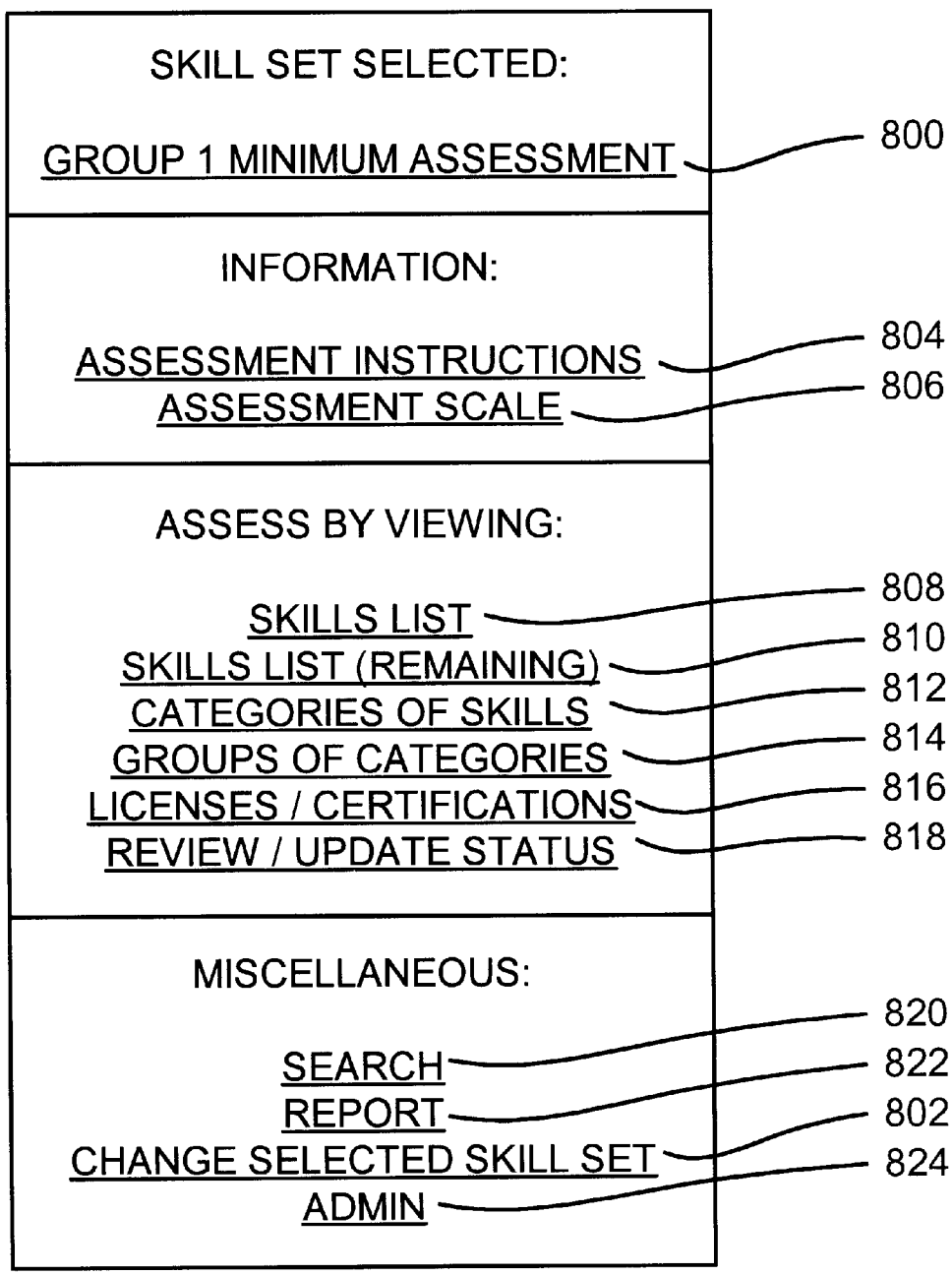
FIG. 8 shows a menu provided by Software Means upon invocation of the skill set analysis tool of the current invention.

FIG. 8 shows a menu provided by Software Means 300 upon invocation of the skill set analysis tool of the current invention. The user may be required to supply a user identifier and a password when invoking the tool. In response, the MSSD for the user is automatically selected by Software Means 300 from the set of MSSDs shown in Block 302 of FIG. 3. This default MSSD is shown listed as item 800 of FIG. 8. For the current example, it will be assumed that an MSSD called "PDX" is selected, wherein this skill set includes skills associated with a corporate employee of the current example that is employed in a Product Development Group for Product X. The user may select an alternative MSSD to be used in performing skill set analysis. This is accomplished by selecting item 802, "Change Selected Skill Set". In response, the user is provided with a menu listing the names of all defined MSSDs from which the alternative MSSD may be selected.

The menu of the preferred embodiment as shown in FIG. 8 includes three basic types of functions. The first type provides information regarding how the tool is to be used, and the assessment scale used to perform the skill set assessment. These are shown as items 804 and 806, respectively. A second type of function provides support for the skill assessment process.

This type of function allows a user to traverse the HSS viewing both the Mandatory and Optional skills as dictated by the selected MSSD. The various functions provided for performing skill set analysis include "Skills List", "Skills List (Remaining)", "Categories of Skills", and "Groups of Categories" shown as items 808 through 814. Each of these functions will be discussed in turn below. The skill assessment functions further include mechanisms for entering data related to licensing and certificates, for updating and reviewing any previously-entered skill set analysis data, as well as for updating and reviewing the status of the skill assessment process for a particular employee. These are shown as items 816 and 818. Finally, a group of miscellaneous functions are provided that relate to Search, Reporting, and Administrative capabilities, and which are shown as items 820–824. The functions shown in FIG. 8 will be discussed below.

The menu of FIG. 8 is the main menu for invoking the various functions of the skill assessment tool of the preferred embodiment. This menu is displayed concurrently with any other menu that may be displayed during any function invocation. This allows a user to re-select one of the main menu functions at any time during the use of a previously-selected function.

As discussed above, functions 808 through 814 allow the user to traverse the HSS shown in FIG. 6 starting at any selectable level in the hierarchy. For example, the user may begin the skill set analysis process from the Group level, the Category level, or the actual Skill level. The manner in which the Groups, Categories, and Skills are displayed is determined by the MSSD that is selected. The functions 808 through 814 for performing skill set assessment are described in turn in the following paragraphs, beginning with those related to initiating the assessment process at the highest level in the HSS.

FIG. 9 is an illustration of a screen display provided following selection of the "Groups of Categories" function 814 using the MSSD "PDX Minimum Assessment" (hereinafter "PDX"). This function selection, and any of the other selections required for use of the current invention, can occur using a series of keyboard key strokes, using a point-and-click device, using a touch or voice activated selection device, or by using any of the other methods known in the art.

The display of FIG. 9 shows all Groups of skills that are included in the HSS for the exemplary corporation which is a manufacturer and supplier of electronics equipment and associated software products. These Groups are shown divided into two classes. Block 900 includes all "Groups with One or More Categories to be Assessed". In other words, Block 900 includes all skill Groups that include at least one skill that must be assessed because that skill is included in MSSD PDX. For example, the skill Group "Business Systems Applications" 901 includes at least one skill in MSSD PDX, and so on. Block 902 lists all other skill Groups that do not include any skills included in MSSD PDX. These are shown as "Additional Competency Dictionary Groups". The user may, but need not, perform assessment for these optional Groups in order for the assessment process to be considered complete.

The current display allows a user to see "at a glance" which skill Groups within the CSS will be involved in the skill set assessment process for the selected MSSD. The user may proceed with the skill set assessment process by selecting any one of the Groups for further viewing. Alternatively, the user may return to the previous screen shown in FIG. 8 by selecting the "Back" function 904. As discussed above, the user may further navigate to another screen display at any time by selecting a different one of the functions from the menu illustrated in FIG. 8, which. This menu is always being displayed concurrently with any of the additional screens that may be provided based on a user function selection.

The skill Group display also informs the user when assessment has been completed for all skills in the MSSD that are included in a particular Group. For example, the current screen informs the user that assessment is complete for all skills included in the MSSD PDX and which are included in skill Group "Software". This is shown by the "*" designator associated with the Group "Software" in Block 906.

FIG. 10 is an illustration of a screen display provided following selection of the "Business Systems Applications" Group in Block 901 of FIG. 9. This display lists all Categories in the selected Group. The Categories are shown divided into two classes. The first class is shown in Block 1000 and designated "Categories with One or more Skills to be assessed". This class lists all Categories that include at least one skill that is also included in the selected MSSD PDX. The "Additional Skill Categories" in Block 1002 list all additional Categories included in the selected skills Group "Business Systems Applications". These additional Categories do not include any skills for which assessment is necessary, although the user may optionally complete assessment for these Categories if desired. In a manner that is similar to that described above in reference to the screen display of FIG. 9, the Category display includes an indication of whether or not skill assessment has been completed for a given Category. This is shown by the "*" indicator. In this example, the assessment process has not been completed for any of the Categories. The user may proceed with the assessment process by selecting a Category. The user may alternatively select the "Back" function 1004 to return to the previously selected screen so that a different Group may be selected for use in the assessment process.

FIG. 11 is an illustration of a screen display provided following selection of the "Enabling Applications" Category in Block 1000. This display lists all Skills in the selected Category. The Skills are shown divided into two classes. The first class is designated "Skills to be assessed for Category: Enabling Applications" in Block 1100. This class lists all Skills included in the selected MSSD PDX that are included in the Category "Enabling Applications". In this example, only Skill "Internet Enabled Applications" meets this set of criteria. The user may select his proficiency in this area by marking one of the proficiency level indicators in Block 1102. In the preferred embodiment, the user may select from one of five proficiency levels including "None", "Basic", "Intermediate", "Advanced", and "Expert". The definitions for these proficiency ratings may be obtained by selecting the link to the Assessment Scale function 806 of FIG. 8. The Assessment Scale function is invoked from the screen of FIG. 11 by selecting the function associated with Block 1103. After the definitions have been reviewed, the user may return to the previous assessment screen using a "Back" function of the type shown in FIG. 11.

In the example screen of FIG. 11, the user selects the "Intermediate" designator, indicating an intermediate level of proficiency in this area of technology. After this designation is selected, the user marks the assessment as being complete for this Category of skills, since all of the included skills have been assessed. This is shown in Box 1104. Then the user may select the "Save" function 1106 to save the assessment data to a central database represented as Analysis Results 112 of FIG. 3.

In a manner that is similar to that discussed above in reference to FIG. 5, each of the skills included in Block 1100 is tagged to indicate the hierarchical level within the Entity Hierarchical Structure that required that the skill be added to the currently-selected MSSD. If more than one business level required addition of the skill to the MSSD, the highest level is indicated. This indication could be accomplished in many ways including through the use of different font types, different colors, or unique character designators. In the current example, font types perform this function. Skills listed in an unmodified font are skills required for inclusion in the MSSD at the corporate level, skills listed in italics are those skill required by the user's corporate division, and skills listed in bold are required by the user's group. In FIG. 11, the italics font type listing the skill "Internet Enabled Applications" indicates the skill was required for inclusion in the MSSD only by the user's Group.

The display of FIG. 11 further lists all additional skills included in the selected Category and which are not included in the selected MSSD. These skills are listed in Block 1108 under "Additional Skill for Category: Enabling Applications". The user may, but need not, complete assessment for these skills. If assessment is performed for one or more of these optional skills, the assessment data is stored by selecting the "Save" function 1110 in a manner similar to that described above. The user may then select the "Back" function 1112 to return to the menu shown in FIG. 10 so that another Category may be selected for assessment. (In the current example, only one Category is included for mandatory assessment as shown in Block 1000, and this selection is therefore not applicable.) Alternatively, the user may select one of the main menu functions displayed in the menu of FIG. 8. As discussed above, this menu is always concurrently displayed with any of the other function menus shown in FIGS. 9–11, and may be used to re-direct the assessment process at any time.

The above discussion describes the manner in which skill assessment is performed using a "top-down" approach to traversing the HSS. According to this approach, the user performs assessment by starting at the top of the HSS to traverse the skill hierarchy. Using the current exemplary HSS, this involves first viewing the Groups, then the Categories, and finally, the Skills that are included in the MSSD. The user may also perform the analysis by starting at an intermediate level in the hierarchy, as discussed in reference to FIG. 12.

FIG. 12 is an illustration of a screen display provided following selection of the "Categories of Skills" function 812 shown in FIG. 8. This display lists all Categories included within the HSS for the Comprehensive Skill Set. The Categories are shown divided into two classes. The first class is shown in Block 1200 and designated "Categories with One or more Skills to be assessed". This class lists all Categories that include at least one skill that is also included in the selected MSSD PDX. The "Additional Skill Categories" in Block 1202 list all additional Categories included within the HSS that do not include skills for which assessment is necessary. The user may optionally complete assessment for these Categories if desired.

In a manner that is similar to that described above, the display includes an indication of whether or not skill assessment has been completed for a given Category. This is shown by the "*" indicator. In a manner that is similar to that discussed above in reference to FIG. 10, the user may proceed with the assessment process by selecting a Category from this display for further processing. Alternatively, the user may select the "Back" function 1204 to return to the previously displayed screen. Upon selection of a Category using any of the selection methods discussed above, a display that is similar to that shown in FIG. 11 is provided for use in performing assessment on the skills included in the selected Category. The user completes the assessment process for the listed skills in the manner discussed above in reference to FIG. 11.

Another approach to performing skill set analysis using the assessment tool of the current invention involves viewing skills as they exist at the lowest level in the HSS. This can be accomplished by selecting the "Skills list" function 808 of FIG. 8.

FIG. 13 is an illustration of a screen display provided following selection of the "Skills list" function 808 shown in FIG. 8. This display lists all skills included in the selected MSSD. This includes a listing of any skills for which analysis has already been completed. These skills may be arranged in any order. In the current embodiment, the skills are grouped in this list by Category. A status line 1301 indicates the total number of Categories associated with the selected MSSD, and the number of Categories included in the current display. The user can complete skill set assessment for any of the skills in the manner discussed above in reference to FIG. 11. Alternatively, the user may view and modify the assessment that has already been performed. In the preferred embodiment, this display only provides a listing of the skills included in the MSSD, thus providing a very efficient means of completing the skill assessment process. In an alternative embodiment, a list of all optional skills not included in the MSSD, also grouped by Category, could be provided at the end of the listing of skills included in the MSSD. It may be recalled in the above discussion that a listing of optional skills may also be obtained using the "Groups of Skills" or "Categories of Skills" menu selections discussed above.

When all skills in a Category have been assessed, the user may designate the Category as being "complete" by marking Box 1302. The user can scroll through the list of skills included in the MSSD by selecting the "Save Changes and get next 5 Categories" function 1304. At any time in the analysis process, the user may re-select another function from the Main Menu of FIG. 8, which is being displayed concurrently with the menu of FIG. 11.

As shown in FIG. 13, the skills are tagged using font types in the manner discussed above to indicate which hierarchical level EHS required the addition of the associated skill to the MSSD. This allows the user to gain information regarding the perceived relative importance of the skill.

The menu of FIG. 13 also includes a "Add Skills to Skill Set Definition" function 1306. This function will be discussed below in reference to the Skill Set Management function.

As noted above, selection of the "Skills list" function provides a list of all skills included in the MSSD, including those skills for which assessment has already been performed. To acquire a list of only those skills for which assessment remains uncompleted, the user selects the "Skills list (Remaining)" function 810 as shown in FIG. 8. A display that is similar to that shown in FIG. 13 is provided that includes those skills for which assessment must still be performed. This condensed list of skills allows a user to scroll through the list more quickly to complete the assessment process. In the current embodiment, skill data is saved on a category by category basis, so the user may exit the tool at any time, and return sometime later to continue with the assessment process.

In addition to the functions described above for allowing a user to complete the assessment process, other miscellaneous functions are provided that provide for the entry of licensing data, and the further review of data that has already been entered. These functions are described below in reference to FIGS. 14 and 15.

FIG. 14 is an illustration of a screen display provided to a user following selection of the "Licensing/Certifications" function 816 shown in FIG. 8. Each of the MSSDs may include data that lists licenses and/or certifications required for a user. These requirements may be viewed by selecting one of the functions 1400, 1402, or 1404. For example, licenses and/or certifications required by the corporation are viewed by selecting function 1400, whereas those licenses and/or certifications required by the user's Group may be viewed by selecting function 1404. The additional licenses and/or certifications that are required by other entities within the corporation that are not applicable to the current user are viewed by selecting one of the functions in Block 1406. The user may return to the previous screen by selecting the Back function 1408.

In an alternative embodiment, the licenses and/or certifications could be displayed in a manner that is similar to the displays provided for skill assessment. That is, all required licenses and/or certifications could be displayed upon invocation of a single function, with a designator such as font type being used to indicate the level within the HSS that made each license or certification a requirement.

FIG. 15 is an illustration of a screen display provided to a user indicating licenses and/or certifications required by the user's corporate Division, which for this example is "Division 1". This is provided in response to the user selecting function 1402 from the screen display of FIG. 14. Similar displays are provided in response to selection of functions 1400 or 1404. This screen allows for entry of data regarding the certification or license that is required, including information pertaining to the issue and expiration dates of the applicable certification or license. As in the other screen displays discussed above, this display provides a "Back" function 1500 to return to a previous display, and a "Save" function 1502 to allow the user to save any entered data.

FIG. 16 is an illustration of a screen display provided to a user in response to selection of the "Review/Update Status" function 818 shown in FIG. 8. This screen allows a user to view "at-a-glance" all skill assessment data that is associated with the selected MSSD by category. This display includes a list of all Groups and Categories containing at least one skill to be assessed, as indicated in Block 1600. The display further indicates when the assessment process was completed for any given skill grouping with the HSS, which in this example includes Groups and Categories. An indication of whether or not license and/or certification data is needed is also provided in Block 1602. A summary of the number of skill Categories for which assessment has been completed is listed.

The user may use the screen of FIG. 16 to obtain the skills list for any of the listed Categories so that the skills assessment process may be continued. This is accomplished by selecting any of the listed Categories in the "Category Name" column. For example, the user may use a point-and-click device to "click" on the "Media Infrastructure Components" Category shown in Block 1603 to obtain a screen similar to that shown in FIG. 11. The user may then complete assessment for the skills included in this Category. Once the process is complete, the user may return to the status screen of FIG. 16 using a "Back" function. This capability allows the user to readily complete assessment for any skills Categories that are indicated as being incomplete.

The screen of FIG. 16 further allows a user to select a "Update Ready for Review Status" function 1608, which sets a flag associated with the user's assessment data stored in the Skills Database 114. This indicates that the assessment process has been completed, and an employee review may now be performed by the employee's manager to evaluate the assessment data. The status flags may also be used to determine the relative completeness of the skills assessment process for any group of employees.

After an employee review has been completed to evaluate skill assessment data, the data may be uploaded to the Skills Database 114. This is accomplished by selecting the "Update Ready for Upload Status" function 1604. In the preferred embodiment, the upload of the assessment data is performed by a system administrator. All data having a "Ready for Upload" timestamp that is more recent than the timestamp of the last upload is copied to the Skills Database 114.

Finally, the screen also allows a user to clear either of these two status indicators. This is accomplished using the "Clear Ready for Review Status" function 1610, and "Clear Ready for Upload Status" function 1606.

FIG. 17 is an illustration of a screen display provided in response to selection of the "Search" function 820 shown in FIG. 8. This function allows a user to search for any phrase that might be contained in any skill included in the CSS. The user may also search for a phrase within any of the license/certification data. The current example shows a user searching for the phrase "CAD Tools".

FIG. 18 is an illustration of a screen provided after selection of the "Report" function 822. The screen includes a detailed account of assessment data entered for a particular employee, which in this case is James Smith. This assessment data may be used by management personnel to perform staffing functions, anticipate training needs, and perform performance reviews. In the preferred embodiment, the report includes a section containing skill assessment data for all MSSD skills. A second section includes all skill assessment data for those skills not included in the selected MSSD, but for which skill assessment was optionally completed. A third report section includes data for the licenses and certifications that are required for use with the MSSD, and a fourth report section lists all optionally-entered license and certification data. FIG. 18 only includes a portion of the section 1 data, and it will be appreciated that additional sections would follow that have a format similar to that shown for section 1. The report further includes an explanation of the assessment scale shown in Block 1800, which defines the various skill levels used to complete the assessment process.

In the preferred embodiment, the reporting function may be used by management personnel to generate reports for those employees included in their managed group(s). Alternatively, a user may employ this function to generate reports summarizing his own skill assessment data. Access to these reports are controlled using user identifications and associated passwords.

Another function provided by the invention of the preferred embodiment is the "Admin" function 824 of FIG. 8. Selection of this function provides the user with access to additional report generation features that are described in detail in the co-pending application entitled "System and Method for Evaluating a Selectable Group of People Against a Selectable Set of Skills" referenced above and incorporated herein by reference in its entirety, (hereinafter, Co-Pending Application). Access to this function is password controlled, and provides the user with access to the management functions that allow for the creation and deletion of the Skill Sets that may be mapped to nodes in a defined EHS as discussed in reference to FIG. 19.

FIG. 19 is an illustration of a screen provided to allow creation and deletion of Skill Sets. These Skill Sets, also referred to as Skill Report Clusters, are named subsets of the CSS. These Skill Sets are used to create the MSSDs, and are also used to generate reports. Before discussing the various uses for the Skill Sets, the manner in which they are defined is described. To create a Skill Set, the name of the Skill Set and the name of the author are entered in Boxes 1900 and 1902, respectively. The initial set of skills to be added to the Skill Set is selected within Selection Box 1906. The type of Skill Set is selected using Selection Indicators 1905 or 1907. FIG. 19 shows Skill Set Indicator 1905 being selected. Additionally, in some cases the Parent Skill Set is specified using Selection Box 1909. Types of Skill Sets, and the use of the Parent Skill Set selection function, are discussed below.

After the appropriate selections are made, the "Create Skill Set" function 1904 is used to create the named Skill Set. The skills included in the newly-created Skill Set are illustrated in Block 1910. This Skill Set may be modified by selecting additional skills from Block 1906, then selecting the "Add to Skill Set" function 1908. This causes the newly-selected skill to also appear in the display in Block 1910. Skills may be deleted from the Skill Set by selecting a skill in Block 1910, then selecting the "Delete from Skill Set" function 1912.

A Skill Set may also be modified using the HSS and some of the menu selections discussed above. To accomplish this, a Skill Set is selected as the current skill set in Block 1900. Then any of the view functions 808–814 are used to traverse the HSS. When at the lowest level in the hierarchy such that the list of skills is being displayed as shown in FIGS. 11 and 13, a skill name may be highlighted for selection. When invoked, the "Add Skill to Skill Set" function, shown as function 1114 of FIG. 11, adds the selected skill to the currently-selected Skill Set. The newly-added skill will appear in Block 1910 when the menu of FIG. 19 is again utilized. A similar "Add Skills to Skill Set Definition" function 1306 is provided by the menu of FIG. 13. These functions allow the HSS to be utilized when defining a Skill Set.

Two types of Skill Sets may be defined. A first type of Skill Set is used to create an MSSD. This type is selected using Selection Indicator 1905. This type of Skill Set is associated with a node in the EHS, as discussed in reference to FIG. 5. The association of the Skill Set with a node in the EHS occurs by specifying a "parent" Skill Set. This parent Skill Set is named using the "Parent Skill Set" Box 1909. The parent Skill Set is chosen to be that Skill Set associated with the node in the EHS which is the parent node of the node associated with the current Skill Set. If Box 1909 is left blank, and a Skill Set of type MSSD is selected, it is assumed the Skill Set is associated with the EHS root node. To aid in selecting the name of the parent Skill Set, the list of all Skill Sets may be obtained by selecting Expansion Arrow 1916 to obtain an expansion window similar to that shown in Block 1908.

The Skill Sets of type "MSSD" are used during skill set analysis. A user selects a particular MSSD Skill Set for use during the skills analysis process using the "Change Selected Skill Set" function 802 of FIG. 8. The MSSD is then created by combining all skills included in the currently-selected Skill Set, and all skills included in any Skill Set that is associated with a node in the EHS that is in the path from the currently-selected Skill Set to the root node of the defined hierarchical structure. That is, the MSSD includes not only the skills from the selected Skill Set, but skills in the selected Skill Set's parent Skill Set, and the parent Skill Set's parent, and so on. Recall that this hierarchical structure is recorded by specifying the parent Skill Set for each of the defined Skill Sets.

A second type of Skill Set is a "Reporting" Skill Set used to generate reports that is created using the Selection Indicator 1907. These reports provide a way to analyze a select group of skills against any subset of the employee population in the database. In the current embodiment, any arbitrary set of skills may be added to a Skill Set. For example, five skills may be selected from the CSS for addition to a Skill Set called "Leadership" that pertain to leadership capabilities. Following the creation of this Skill Set, the report generator may be used to select any group of employees for analysis using the Skill Set. According to this reporting function, a report may be created that includes the assessment data pertaining to the skills included in the Skill Set for the selected group of employees. A detailed explanation of this reporting system and method is provided in the Co-pending Application. When Skill Sets are defined for reporting purposes, a parent node in the EHS need not be specified using Block 1909, since the Skill Set will not be used to generate any of the MSSDs.

Figure 20:
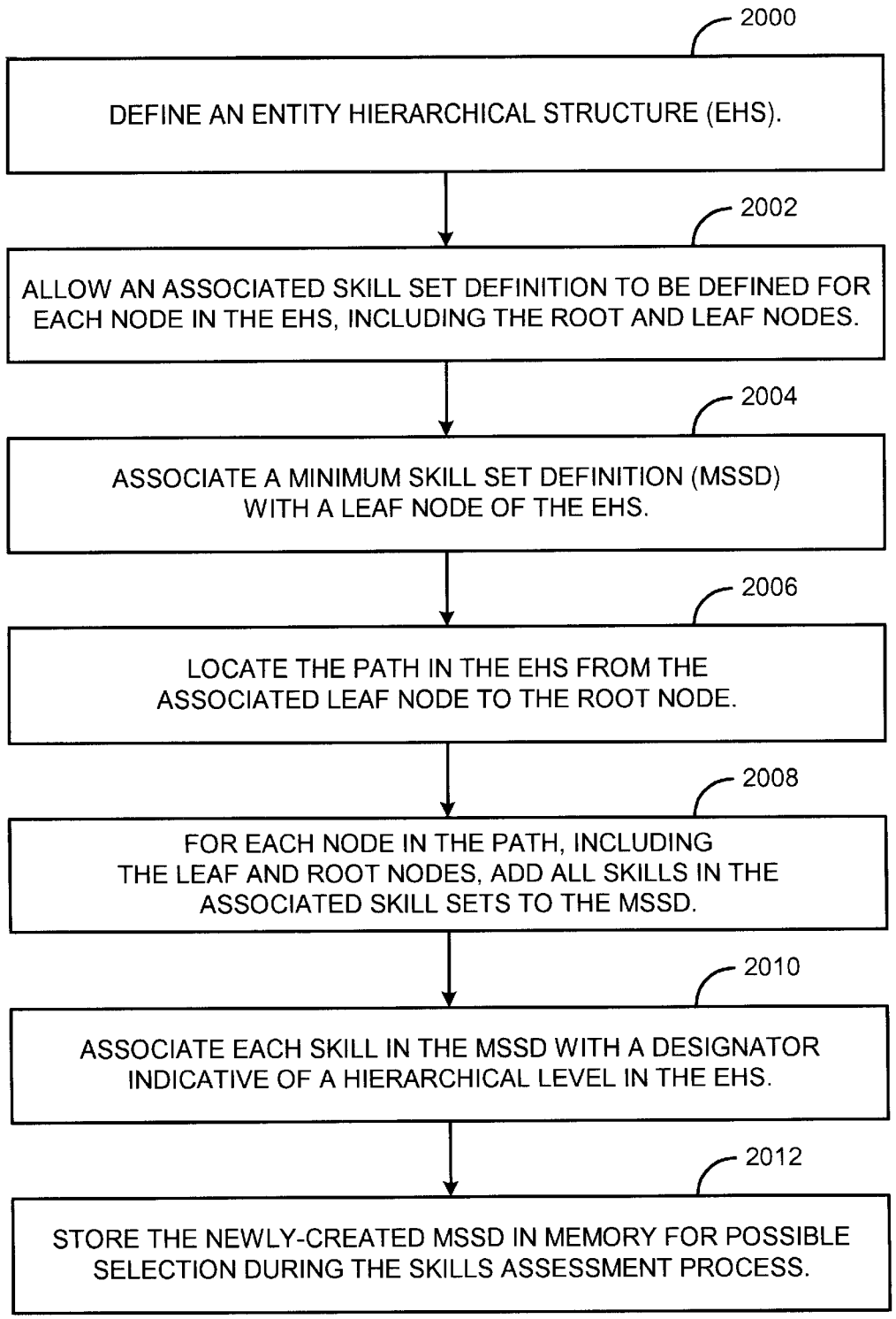
FIG. 20 is a flowchart illustrating the computer-implemented process used to define a Minimum Skill Set Definition.

FIG. 20 is a flowchart illustrating computer-implemented process used to define a MSSD. This process is provided by MSSD Means 310 of FIG. 3. In Step 2000, an Entity Hierarchical Structure (EHS) is stored in memory such as that provided by Storage Device 104. This EHS can be created using database techniques known in the art, and represents the entity using the current invention. As discussed above, the root node represents the entire entity. Each of the nodes located at a lower level in the hierarchy represent a portion of the entity that is a sub-set of the portion of the entity represented by that node's parent node.

In Step 2002, a Skill Set Definition may, but need not, be associated with each of the nodes in the EHS. These Skill Sets are defined using the functions illustrated in FIG. 19, and may be stored in memory such as that provided by Storage Device 104. The Skill Sets may be associated with a node in the EHS, as may be implemented in memory using pointers associated with records, or using other designators as is known in the art. In Step 2004, a Minimum Skill Set Definition (MSSD) is associated with a leaf node of the EHS. Then the path from the associated leaf node to the root node is located, as shown in Step 2006. The Skill Sets associated with each of the nodes included in the located path, including the root and leaf nodes, are used to define the MSSD. That is, each of the skills included in a Skill Set associated with the nodes in the located path are added to the MSSD, as shown in Step 2008. A particular skill is only included in the MSSD once, even though the skill may be included in multiple ones of the Skill Sets used to create the MSSD. Finally, a designator is attached to each skill in the MSSD to indicate the node in the EHS that required the addition of this skill to the MSSD. This is shown in Step 2010. If multiple Skill Sets include a particular skill, a predetermined conflict resolution process will be used. In the invention of the preferred embodiment, a designator will associate a skill to the node that is at the highest level in the EHS. Other conflict resolution methods could be used, such as selecting the node that is at the lowest level in the EHS for association with the skill, or selecting an entirely different designator to indicate the multiple nodes that made the requirement. The newly created MSSD is stored in a memory such as that shown as Storage Device 104 of FIG. 3. This is illustrated in Step 2012.

Figure 21A:
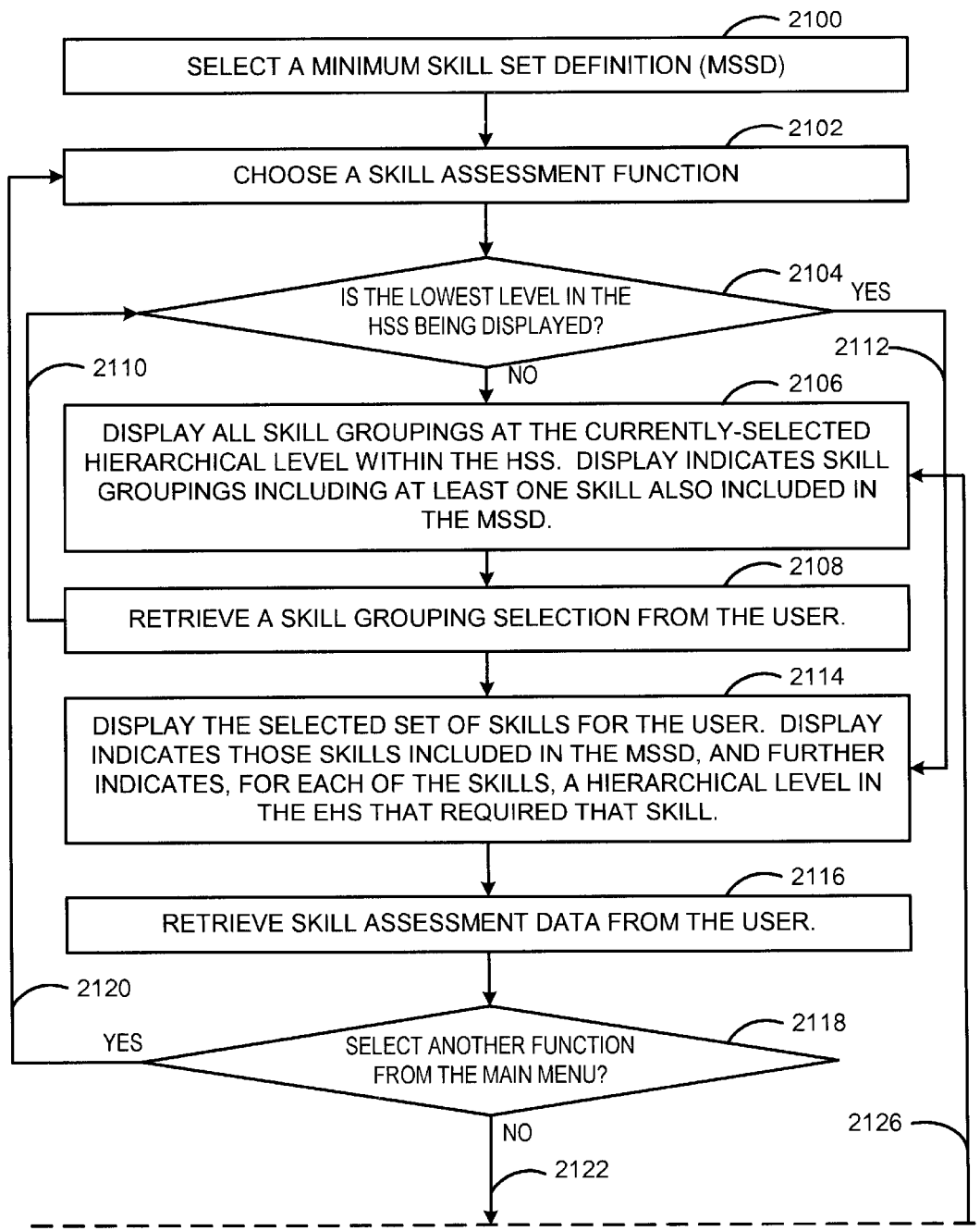

FIGS. 21A and 21B, when arranged as shown in FIG. 21, is a flowchart illustrating the computer-implemented process used to perform skill set assessment with a selected MSSD and the HSS for a given entity. In Step 2100, a MSSD is selected using the "Change Selected Skill Set" function 802 of FIG. 8. This function provides a list of all defined MSSDs, and the user is allowed to select which of these MSSDs is to be used to perform skill assessment. According to the preferred embodiment of the invention, the user is assigned a default MSSD upon entry into the skill assessment tool. This default MSSD is that MSSD that reflects the user's position within the entity.

In Step 2102, the user selects a skill assessment function from the menu shown as items 808–814 of FIG. 8. The selected function may provide a view at high or an intermediate level in the HSS, or may provide a view at the lower level in this hierarchy. If the selected function does not provide a view of the lowest level of the HSS, the Skill Groupings residing at the hierarchical level that is associated with the selected function are displayed. This is illustrated by Decision Step 2104 and Step 2106. In the current embodiment, for example, a list of skill Categories are displayed if the "Categories of Skills" function 812 is selected.

According to the invention, and as discussed above, the display is broken into two portions or classes. The first portion displays those skill Groupings that include at least one skill also included in the selected MSSD, and the second portion including those skill Groupings that do not include any skills also included in the selected MSSD.

In Step 2108, one of the displayed skill Grouping may be retrieved from the user, and the process is repeated, as indicated by Arrow 2110. That is the skill Groupings included in the currently-selected skill Grouping are displayed and the user may further select one of these Groupings. In this manner, a user may traverse down the hierarchical tree associated with the HSS.

Eventually, the user will reach the lowest level in the HSS. This may be accomplished using the traversal process discussed above, or may be accomplished by selecting the "Skills list" or "Skills list (Remaining)" functions 808 and 810, respectively, of FIG. 8. This is shown by Arrow 2112. In response, a list of skills are displayed for the user as shown in Step 2114. This type of skills list display is illustrated in FIG. 13. As discussed above, in the preferred embodiment, the display is divided into two portions, with a first portion displaying skills associated with the selected MSSD, and the second portion being associated with skills not included within the MSSD, and for which assessment is optional. Additionally, each of the skills in the first display portion is displayed with a designator indicating a node within the EHS that required the addition of this skill to the MSSD. In Step 2116, the user may perform skill assessment on any of the displayed skills in either portion of the display. This assessment data is stored as Analysis Results 112 in Storage Device 104 (FIG. 3).

Next, another function may be selected from the main menu of FIG. 8, as indicated by Decisional Step 2118 and Arrow 2120. Alternatively, flow may continue to FIG. 21B as indicated by Arrow 2122, and the user may select to traverse up the hierarchy of the HSS. This allows the user to again view one of the previously-displayed skill Groupings so that additional ones of the skills can be assessed. This traversal is accomplished by selecting one of the "Back" functions such as Back function 1304 of FIG. 13. This traversal to a higher level in the HSS is shown by Step 2124 and Arrow 2126. It may be noted that the use of the Back function, as well as re-selection of any of the menu functions of FIG. 8, may also be performed any time during the execution of Steps 2104 through 2108.

If the user desires to discontinue the assessment process, the Exit function may be selected. Alternatively, one of the other functions shown in the menu of FIG. 8 and which is not directly associated with entering assessment data may be selected. This is illustrated by Step 2128. Assessment is considered complete when all skills included in the MSSD have been assessed.

Having described an exemplary embodiment of the invention in the drawings and accompanying description, those skilled in the art will recognize that various modifications to the exemplary embodiment could be made without departing from the scope and spirit of the claims set forth below.

What is claimed is:

1. A skill set assessment tool for allowing a user to rate the user's proficiency in performing a comprehensive set of skills, comprising:

a storage device to store data signals indicative of the comprehensive set of skills;

skill set definition means coupled to said storage device for creating multiple Minimum Skill Set Definitions (MSSDs), each of said MSSDs including a subset of the skills included in the comprehensive set of skills; and a user interface coupled to said storage device to allow the user to select one of said MSSDs for use in rating the user's proficiency at each of the skills included in said MSSD after reviewing only said subset of skills included in said MSSD and without having to review all skills included in the comprehensive set of skills, said selected one of said MSSDs including only skills relevant to the user.

2. The skill set assessment tool of claim 1, wherein said storage device includes circuits to store data signals indicative of a Hierarchical Skill Structure (HSS), said HSS for organizing all of the skills in the comprehensive set of skills according to a multi-level hierarchical tree structure having a predetermined number of levels, wherein a root node of said HSS represents all skills in the comprehensive set of skills, and each of the other nodes of said HSS represents a subset of the set of skills represented by said each of the other node's parent node.

3. The skill set assessment tool of claim 2, wherein each of the nodes in said hierarchical tree structure is associated with a name indicator, and wherein said user interface includes hierarchical traversal means for allowing a user to traverse said hierarchical tree structure, and for further allowing a user to view, at each of said nodes in said hierarchical tree structure that is not a leaf node, a list including any of said name indicators associated with any of the child nodes of said each node.

4. The skill set assessment tool of claim 3, wherein said hierarchical traversal means includes means for dividing said list including any of said name indicators into first and second portions, each of said name indicators in said first portion being indicative of a respective one of said subsets of skills that includes at least one skill that is also included in said selected MSSD, and each of said name indicators in said second portion being indicative of a respective one of said subsets of skills that does not include any skills that are also included in said selected MSSD.

5. The skill set assessment tool of claim 3, wherein said hierarchical traversal means includes means for allowing the user to view, at each of said nodes in said hierarchical tree structure that is a leaf node, a list of said subset of the comprehensive set of skills that is associated with said leaf node.

6. The skill set assessment tool of claim 5, wherein said hierarchical traversal means includes means for dividing each said list of said subset of the comprehensive set of skills that is associated with said leaf node into first and second portions, said first portion being a list of all skills that are included in said subset of the comprehensive set of skills associated with said leaf node and that are also included in said selected MSSD, and said second portion being a list of skills that are included in said subset of the comprehensive set of skills associated with said leaf node and that are not included in said selected MSSD.

7. The skill set assessment tool of claim 1, wherein said skill set definition means includes MSSD Skill Set definition means for defining MSSD Skill Sets, wherein each of said MSSD Skill Sets include a subset of the skills included in the comprehensive set of skills, and wherein multiple MSSD Skill Sets may be used to create an MSSD.

8. The skill set assessment tool of claim 7, wherein said MSSD Skill Set definition means includes means for defining a hierarchical tree structure by defining parent/child relationships between ones of said MSSD Skill Sets, said ones of said MSSD Skill Sets each representing a respective node in said hierarchical tree structure, and wherein said hierarchical tree structure may be defined to represent the hierarchical structure of an entity employing said skill set assessment tool.

9. The skill set assessment tool of claim 8, wherein said skill set definition means includes means for defining each of said MSSDs by including in said each of said MSSDs all skills in a respectively associated one of said MSSD Skill Sets, and by further including all skills in any of said MSSD Skill Sets that represents a node in said hierarchical tree structure that resides within the path between the node represented by said respectively associated one of said MSSD Skill Sets and the root node of said hierarchical tree structure.

10. The skill set assessment tool of claim 9, wherein said skill set definition means includes means for attaching a respective indicator to each of the skills included in each of said MSSDs, each said indicator indicating one or more of said MSSD Skill Sets that includes said each of the skills, said one or more of said MSSD also residing within said path between said node represented by said respectively associated one of said MSSD Skill Sets and said root node of said hierarchical tree structure, and wherein each of said indicators may be viewed by a user using said user interface.

11. The skill set assessment tool of claim 10, wherein said storage device includes circuits to store data signals indicative of a Hierarchical Skill Structure (HSS), said HSS for organizing all of the skills in the comprehensive set of skills according to a multi-level hierarchical tree structure having a predetermined number of levels, wherein a root node of said HSS represents all skills in the comprehensive set of skills, and each of the other nodes of said HSS represents a subset of skills included in the set of skills represented by said each of the other node's parent node.

12. The skill set assessment tool of claim 11, wherein said user interface means includes means for traversing said HSS to view, for any subset of skills represented by any leaf node in said HSS, each skill included in said any subset of skills along with said each skill's said respective indicator.

13. An automated method of obtaining data related to a user's proficiency at performing skills included within a Comprehensive Skill Set (CSS) stored within a storage device of a data processing system, the method comprising the steps of:
  a.) defining multiple Minimum Skill Set Definitions (MSSDs) to be stored in the storage device, each including a subset of the skills included in the CSS;
  b.) selecting one of said MSSDs for use in assessing the user's skill proficiency; and
  c.) presenting a list of all skills included within a selected MSSD to the user for use in allowing the user to perform skills assessment, said list including only those skills that must be assessed by the user to complete said skills assessment.

14. The method of claim 13, wherein said step (c) further includes the step of presenting an optional list of skills for optional review and assessment by the user, said optional list of skills including all skills in the CSS not included in said selected MSSD.

15. The method of claim 14, and further including the step of defining a Hierarchical Skill Structure (HSS) for the CSS, said HSS being a hierarchical tree structure, with the root node of the hierarchical tree structure representing all skills included in the CSS, and each of the other nodes of the hierarchical tree structure representing a group of skills that is a subset of the group of skills represented by said each of the other node's parent node.

16. The method of claim 15, wherein step (c) includes the step of presenting said list of mandatory skills as organized into sub-groupings according to said groups of skills defined in said HSS.

17. The method of claim 16, wherein step (c) includes the step of allowing the user to obtain said list of mandatory skills organized into said sub-groupings by traversing said HSS, whereby a user may traverse to any node in said HSS if said group of skills represented by said any node includes at least one of the skills included in said selected MSSD.

18. The method of claim 17, wherein step (c) includes the step of presenting said list of optional skills as organized into sub-groupings according to said groups of skills defined in said HSS.

19. The method of claim 13, wherein step (b) is performed automatically by assigning a user one of said MSSDs according to the user's employment position.

20. The method of claim 13, wherein the CSS is defined to include skills relevant to the employment positions provided by a particular entity, and wherein step (a) includes the step of defining each of said multiple MSSDs to reflect a respective one of the employment positions.

21. The method of claim 13, wherein the CSS is defined to include skills relevant to the employment positions provided by a particular entity, and further including the step of defining an Entity Hierarchical Structure (EHS) to represent the organization of the entity, wherein the root node of said EHS represents the entity, and wherein each of the other nodes represents a subset of the portion of the entity represented by said each of the other nodes' parent node, and wherein each of the nodes in said EHS is associated with a Skill Set which is a subset of the CSS.

22. The method of claim 21, wherein step (a) includes the steps of:
  (a1) creating a new one of said MSSDs and associating said created MSSD with a leaf node in said EHS, wherein said associated leaf node becomes the current node;
  (a2) adding to said created MSSD each of the skills included in the Skill Set associated with said current node;
  (a3) traversing said EHS from the current node to said current node's parent node which becomes the new current node; and
  (a4) repeating steps a2 and a3 until said steps a2 and a3 are performed for the root node of said EHS.

23. The method of claim 22, and further including the step of associating each of the skills included within said MSSD with an indicator indicating which of the one or more Skill Sets was utilized during step a2 to add said each of the skills to said MSSD.

24. The method of claim 23, wherein said step (c) includes the step of presenting each of the skills in said list of mandatory skills with said associated indicator, whereby a user is informed as to which of said one or more Skill Sets resulted in said each of the skills being added to said MSSD.

25. The method of claim 13, wherein step (a) includes the step of defining ones of said MSSDs to include data associated with mandatory licensing requirements.

* * * * *